US012074388B2

(12) United States Patent
Moon et al.

(10) Patent No.: US 12,074,388 B2
(45) Date of Patent: Aug. 27, 2024

(54) COVER WITH ANTENNA FUNCTION

(71) Applicants: NISSHA CO., LTD., Kyoto (JP); INU RESEARCH & BUSINESS FOUNDATION, Incheon (KR)

(72) Inventors: In Yeol Moon, Gyeonggi-do (KR); Ryomei Omote, Kyoto (JP); Yoshihiro Sakata, Kyoto (JP); Toshifumi Kurosaki, Kyoto (JP); Shohei Morimoto, Kyoto (JP); Sungtek Kahng, Seoul (KR); Changhyeong Lee, Gyeongsangbuk-do (KR); Yejune Seo, Incheon (KR); Gwang-gyun Namgung, Incheon (KR); Munsu Jeon, Incheon (KR)

(73) Assignees: NISSHA CO., LTD., Kyoto (JP); INU RESEARCH & BUSINESS FOUNDATION, Incheon (KR)

( * ) Notice: Subject to any disclaimer, the term of this patent is extended or adjusted under 35 U.S.C. 154(b) by 293 days.

(21) Appl. No.: 17/776,725

(22) PCT Filed: Nov. 11, 2020

(86) PCT No.: PCT/JP2020/042163

§ 371 (c)(1),
(2) Date: May 13, 2022

(87) PCT Pub. No.: WO2021/095789

PCT Pub. Date: May 20, 2021

(65) Prior Publication Data

US 2022/0384954 A1 Dec. 1, 2022

(30) Foreign Application Priority Data

Nov. 14, 2019 (JP) ................................ 2019-206491
Mar. 11, 2020 (JP) ................................ 2020-042326

(51) Int. Cl.
*H01Q 5/50* (2015.01)
*H01Q 1/50* (2006.01)
*H01Q 5/20* (2015.01)

(52) U.S. Cl.
CPC ................ *H01Q 5/50* (2015.01); *H01Q 1/50* (2013.01); *H01Q 5/20* (2015.01)

(58) Field of Classification Search
CPC ......... H01Q 5/20; H01Q 5/50; H01Q 15/0086
See application file for complete search history.

(56) References Cited

U.S. PATENT DOCUMENTS

2011/0170267 A1* 7/2011 Ando .................... H01Q 15/14 174/126.1
2012/0242556 A1* 9/2012 Ando ...................... H01Q 9/42 343/834

(Continued)

FOREIGN PATENT DOCUMENTS

CN 110416739 B 9/2021
JP 2011-056683 A 3/2011

(Continued)

OTHER PUBLICATIONS

Supplementary EP search report EP20887395 dated Oct. 13, 2022 (pp. 1-8).

(Continued)

*Primary Examiner* — Jason M Crawford
(74) *Attorney, Agent, or Firm* — Millen, White, Zelano & Branigan P.C.; William F. Nixon

(57) ABSTRACT

A decrease in performance of an antenna is suppressed while maintaining metallic design by a metal vapor deposition layer in a cover with antenna function. A back cover includes cover member, a pictorial pattern layer, and a metasurface. The pictorial pattern layer is arranged in a layering direction with respect to the cover member and includes a metal vapor deposition layer. The metasurface is arranged side by side in (Continued)

the layering direction with the pictorial pattern layer. The metasurface amplifies an antenna signal.

19 Claims, 40 Drawing Sheets

(56) References Cited

U.S. PATENT DOCUMENTS

| | | | | |
|---|---|---|---|---|
| 2013/0323579 | A1* | 12/2013 | Hwang | H01Q 15/0013 156/242 |
| 2016/0204502 | A1 | 7/2016 | Misra et al. | |
| 2022/0353353 | A1* | 11/2022 | Ichihara | B32B 7/023 |
| 2022/0384954 | A1* | 12/2022 | Moon | H01Q 5/20 |

FOREIGN PATENT DOCUMENTS

| | | |
|---|---|---|
| JP | 2014-060237 A | 4/2014 |
| JP | 2019-026508 A | 2/2019 |

OTHER PUBLICATIONS

English Translation of International Search Report for PCT/JP2020/042163 dated Jan. 26, 2021.
English Abstract of JP-2011056683, Publication Date: Mar. 24, 2011.
English Abstract of JP2014060237, Publication Date: Apr. 3, 2014.
English Abstract of JP2019026508, Publication Date: Feb. 21, 2019.

* cited by examiner

COVER WITH ANTENNA FUNCTION

TECHNICAL FIELD

The present invention relates to a cover, and especially relates to a cover with antenna function.

BACKGROUND ART

Electronic devices, such as smart phones, mobile phones, and tablet terminals, include transmission/reception antennas for wireless communication (for example, WiFi, GPS, and Bluetooth (trade name), 3G, and LTE) (for example, see Patent Document 1).

Practical use of a 5G system is advancing, and beamforming (beam steering) performance is required for a 5G antenna (drive frequency: 28 GHz) in the 5G system. As a type of the 5G antenna, there is a patch array antenna in which a plurality of (for example, 1×4, 2×4, and 8×8) patch antennas are arrayed. An electrode material of the patch antenna includes, for example, a metal, such as Cu, Ag, Sn, Al, Au, and Pt, an alloy thereof, and metal ink containing a resin (an Ag paste). A dimension of one side of the patch antenna is, for example, approximately $\lambda/2=5$ mm (in the case of 28 GHz).

In addition, in recent years, studies on a back cover that protects, not only a display surface of an image display device, but also a back surface of the display surface against, for example, an impact have been in progress in the electronic device described above (see, for example, patent Document 2).

CITATION LIST

Patent Literature

Patent Document 1: JP 2015-79399 A
Patent Document 2: JP 2019-26508 A

SUMMARY OF INVENTION

Technical Problem

The back cover arranged on the back surface side of the image display device is required to be aesthetically excellent as a required property other than a mechanical strength. Therefore, the back cover used for, for example, a smartphone includes, for example, a glass layer, a substrate, and a pictorial pattern layer layered between both. The pictorial pattern layer includes, for example, a design layer, a metal vapor deposition layer, and a design layer. The design layer is made of, for example, design ink, a film, and a resin. The metal vapor deposition layer is made of, for example, ZnS and Ag, and achieves metallic design.

On the other hand, the antenna structure includes, for example, a micro strip line provided on the side opposite to the glass layer of the cover and an antenna element provided on the glass layer side of the cover, and contactless power feed is performed between both. Since the metal vapor deposition layer described above is provided between the microstrip line and the antenna element in the layering direction, and thus a signal is attenuated. The signal from the antenna structure is also attenuated by the glass layer.

The inventor of the present invention has found that this problem is particularly remarkable in 5G antennas. Specifically, it was predicted that while an amount of attenuation of a signal was several % in a 4G antenna, an amount of attenuation of a signal was several tens % in a 5G antenna.

An object of the present invention is to suppress a decrease in performance of an antenna while maintaining metallic design by a metal vapor deposition layer in a cover with antenna function.

Another object of the present invention is to improve the antenna performance by suppressing a decrease in antenna radiation characteristics by a cover member, such as a glass, in the cover with antenna function.

Solution to Problem

Some aspects will be described below as means to solve the problems. These aspects can be combined arbitrarily as necessary.

A cover with antenna function according to an aspect of the present invention is used to be mounted on a substrate provided with an electromagnetic wave transmission path. The cover with antenna function includes a cover layer, a pictorial pattern layer, and a metasurface as an antenna element.

The pictorial pattern layer is arranged in a layering direction with respect to the cover layer and includes a metal vapor deposition layer.

The metasurface is arranged side by side in the layering direction with the pictorial pattern layer. The metasurface amplifies an antenna signal.

The cover achieves metallic design by the metal vapor deposition layer in the pictorial pattern layer. Since the cover employs the metasurface, magnetic permeability becomes a negative value. Thus, an amount of signal attenuation in an antenna can be reduced. As a result, a decrease in performance of the antenna can be suppressed.

The cover may further include a feed unit that includes the electromagnetic wave transmission path. The feed unit may input a high frequency power to the antenna element.

The metasurface may have a shape to constitute an equivalent circuit that matches impedances between the feed unit and the antenna element.

With this cover, the amount of signal attenuation in the antenna can be reduced. As a result, a decrease in performance of the antenna can be suppressed.

The metasurface may be opposed to the electromagnetic wave transmission path in the layering direction between which the pictorial pattern layer is interposed.

The metasurface may be arranged between the pictorial pattern layer and the electromagnetic wave transmission path in the layering direction. The metasurface may be opposed to the electromagnetic wave transmission path in the layering direction.

The cover mat further includes an array antenna arranged between the metasurface and the electromagnetic wave transmission path in the layering direction.

The metal vapor deposition layer may have a thickness of 0.1 μm or less.

With the cover, the metal vapor deposition layer is sufficiently thin, and thus the amount of signal attenuation in the antenna structure can be reduced. As a result, a decrease in performance of a 5G antenna can be suppressed.

The metal vapor deposition layer may be made of any of ZnS, Al, Ag, Au, and Pt.

This cover allows achieving excellent metallic design.

The metasurface may have a fractal shape.

This cover improves antenna performance.

The array antenna may be configured to handle multiple bands.

The metasurface may have a pattern structure in which the metasurface is provided at a position opposed to the array antenna in the layering direction.

With the cover, in the antenna structure configured to handle the multiple bands, the metasurface allows matching the impedances between the equivalent circuit of, for example, the array antenna and the equivalent circuit of, for example, the metasurface and the cover member. As a result, signal attenuation and a distortion phenomenon of a radiation pattern due to the influence of the cover can be reduced. It is considered that the signal attenuation and the distortion phenomenon of the radiation pattern occur by a mismatch of an antenna input impedance and a physical loss caused by the cover itself.

The metasurface may have the pattern structure including a low-frequency pattern and a high-frequency pattern.

The metasurface may have the pattern structure including a pattern for multiple polarization.

Advantageous Effects of Invention

With the cover with antenna function according to the present invention, while the metallic design by the metal vapor deposition layer is maintained, the decrease in performance of the antenna can be suppressed.

DESCRIPTION OF EMBODIMENTS

1. First Embodiment (1) Basic Configuration

Figure 1:
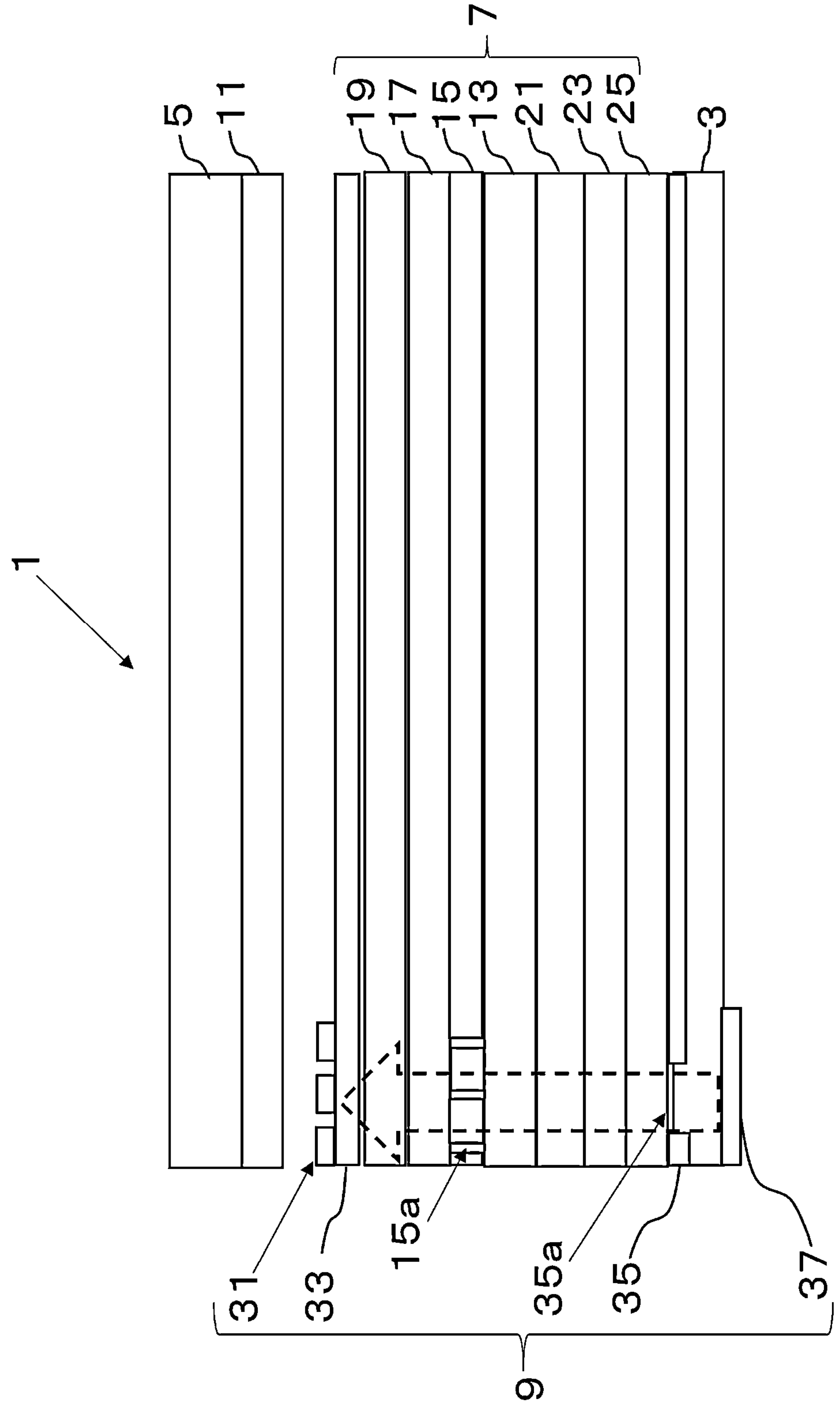
FIG. 1 is a schematic cross-sectional view of a back cover according to a first embodiment.

A back cover 1 (an example of a cover with antenna function) will be described with reference to FIG. 1. FIG. 1 is a schematic cross-sectional view of the back cover according to the first embodiment.

The back cover 1 is used for electronic devices, such as mobile phones, smart phones, and tablets.

The back cover 1 constitutes a chassis mounted on a rear face side of a display unit of the electronic device or a back surface thereof. The back cover 1 is used in combination with a substrate 3 (described later) on which a slot array antenna 35*a* (described later) is formed. The back cover 1 mainly includes a cover member 5 and a pictorial pattern layer 7. Note that the upper side of FIG. 1 is outside the electronic device, and the lower side of FIG. 1 is inside (the display unit side) the electronic device.

(2) Substrate

The substrate 3 (an example of a substrate) is a main board Printed Circuit Board (PCB) formed in a flat plate shape.

(3) Cover Member

The cover member 5 (an example of a cover layer) is arranged on the upper side in the layering direction of the substrate 3. The cover member 5 is, for example, a cover glass. The cover member 5 may be a resin or a hard coat.

The thickness of the cover member 5 is, for example, 0.65 mm.

An adhesive layer 11 is provided on the lower surface of the cover member 5. The thickness of the adhesive layer 11 is, for example, 100 μm.

(4) Pictorial Pattern Layer

The pictorial pattern layer 7 (an example of a pictorial pattern layer) entirely has an integrated film configuration, and is arranged between the substrate 3 and the cover member 5.

The pictorial pattern layer 7 includes a PET film 13 as a base substrate. The thickness of the PET film 13 is, for example, 100 μm.

The pictorial pattern layer 7 includes a metal vapor deposition layer 15, a first design layer 17, and an adhesive layer 19 arranged on the upper side of the PET film 13. They are layered from bottom to top in the order described above. The metal vapor deposition layer 15 is made of, for example, ZnS, Al, Ag, Au, Ni, and Pt. The first design layer 17 is made of, for example, design ink, a film, and a resin. The thickness of the metal vapor deposition layer 15 is, for example, 0.1 μm, the thickness of the first design layer 17 is, for example, 1 μm, and the thickness of the adhesive layer 19 is, for example, from 3 to 4 μm.

The thickness of the metal vapor deposition layer 15 is preferably 0.1 μm (100 nm) or less. This allows maintaining performance of an antenna structure 9 and achieving metallic design of the back cover 1. The thickness of the metal vapor deposition layer 15 is preferably 50 nm or greater or 90 nm or greater. This allows achieving the metallic design of the back cover 1.

The pictorial pattern layer 7 includes a second design layer 21, a base color layer 23, and a backup layer 25 arranged on the lower side of the PET film 13. They are layered from top to bottom in the order described above. The second design layer 21 is made of, for example, design ink, a film, and a resin. The thickness of the second design layer 21 is, for example, 1 μm, the thickness of the base color layer 23 is, for example, 1 μm, and the thickness of the backup layer 25 is, for example, 1 μm.

Note that the configuration of the pictorial pattern layer, the thickness of each layer, or the material of each layer is not particularly limited. For example, some of the plurality of layers may be omitted, or a different layer may be added.

(5) Antenna Structure

The antenna structure 9 is a 5G antenna. The 5G antenna uses the following two frequency bands.

1) sub6:6 GHz or less (Especially, 3.48 to 4.2 GHz and 4.4 to 4.9 GHz are under consideration in Japan.)
2) mmWave: 25 to 80 GHz (Especially, 43.5 GHz or less is under consideration in Japan.)

The antenna structure 9 employs a contactless power feed (aperture coupled feed) structure (described later).

A ground electrode 35 and a slot array antenna (no electrode area) **35*a* are formed on the upper surface of the substrate 3**.

The slot array antenna **35*a* is formed at the same position as metasurfaces 31** in plan view.

The antenna structure 9 includes a feed line 37 (an example of an electromagnetic wave transmission path). The feed line 37 is formed on the lower surface of the substrate 3. The feed line 37 is formed at a position corresponding to the slot array antenna **35*a*** in plan view.

The feed line 37 is, for example, a microstrip line and supplies a high-frequency signal RF to the metasurface 31 as an antenna element. The feed line 37 passes through the slot array antenna **35*a* of the ground electrode 35 and is connected to the metasurface 31 by capacitive coupling. Note that the feed line 37** is connected to a peripheral circuit (not illustrated).

The antenna structure 9 further includes the metasurfaces 31 (an example of a metasurface) that performs antenna signal amplification as a 5G radio lens. The metasurface is "a periodic structure shorter than an artificially constructed incident radio wave." Since electromagnetic field characteristics are determined by a resonance phenomenon of the periodic structure in the metasurface, appropriately designing the periodic structure allows obtaining peculiar electromagnetic field characteristics that cannot be obtained from a natural world.

The antenna structure 9 includes a low-loss film 33. The low-loss film 33 is provided on the adhesive layer 19 in the pictorial pattern layer 7. The metasurface 31 is formed on the low-loss film 33 as a conductive member, and therefore is arranged separated from the ground electrode 35 so as to be opposed.

Between the metasurfaces 31 and the ground electrode 35, the above-described pictorial pattern layer 7 is arranged. Note that, in the pictorial pattern layer 7, a plurality of slits **15*a* (an example of a plurality of holes) may be formed at the same planar position as the metasurfaces 31 in the metal vapor deposition layer 15**.

Forming the slits **15*a*** improves antenna performance.

The metasurface 31 is, for example, formed of a visible light transparent conductive film. Specifically, Indium Tin Oxide (ITO) and transparent conductive ink (for example, silver nanowire ink) are used.

Figure 2:
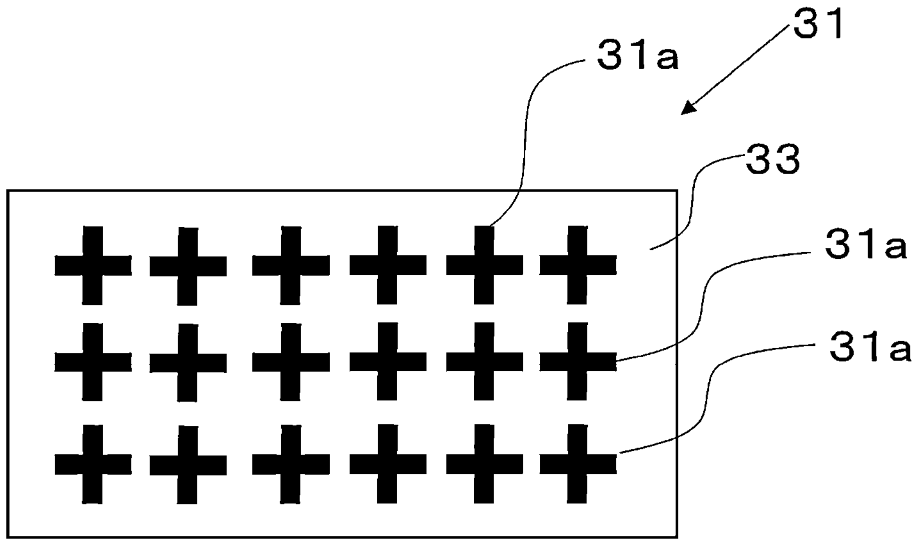
FIG. 2 is a schematic plan view illustrating a pattern shape of a metasurface.

Arrangement of conductive members **31*a* of the metasurface 31 will be described with reference to FIG. 2. FIG. 2** is a schematic plan view illustrating a pattern shape of the metasurface.

In FIG. 2, the metasurface 31 is formed of a plurality of the conductive members **31*a* formed on the surface of the low-loss film 33. The plurality of conductive members 31*a* are arranged in a two-dimensional square lattice shape (namely, in a matrix). The conductive member 31*a*** has a cross shape.

As a modified example, the metasurface may be constituted by holes arranged in a two-dimensional square lattice shape (namely, in a matrix) having periodicity in the conductive members.

The shape of the conductive member or the hole is not particularly limited, and may be a quadrangular shape or a V shape.

As described above, the shape of the conductive members can be various shapes in addition to the example of FIG. 2 as long as the conductive members can be periodically arranged.

Note that the metasurface only needs to have a shape to constitute an equivalent circuit that matches impedances between a feed unit (including the feed line 37) that inputs a high frequency power to the antenna element and the antenna element.

(6) Effects of Embodiment

The back cover 1 achieves the metallic design by the metal vapor deposition layer 15 in the pictorial pattern layer 7. Further, since the metasurface 31 is employed as the 5G antenna and provided above the slot array antenna 35*a*, magnetic permeability becomes a negative value. In addition, the metasurface constitutes the equivalent circuit that matches the impedances between the feed unit that inputs the high frequency power to the antenna element and the antenna element. Thus, an amount of signal attenuation in the antenna structure 9 can be reduced. As a result, the decrease in performance of the 5G antenna can be suppressed.

In the back cover 1, the thickness of the metal vapor deposition layer 15 is 0.1 μm or less, which is sufficiently thin, and thus the amount of signal attenuation in the antenna structure 9 can be reduced. As a result, the decrease in performance of the 5G antenna can be suppressed.

In the back cover 1, the plurality of slits 15*a* are formed on the metal vapor deposition layer 15 between the feed line 37 and the metasurfaces 31 in the layering direction Accordingly, the amount of signal attenuation in the antenna structure 9 can be reduced. As a result, the decrease in performance of the 5G antenna can be suppressed.

As described above, the metasurface 31 is constituted by the metal pattern layer and differs in a phase of a transmitting electromagnetic wave according to a distance from the representative point on the metal pattern layer. The metal pattern layer has a structure in which a plurality of types of unit structures configured including a metal are two-dimensionally aligned regularly with certain rules or randomly. The size of the unit structures is sufficiently smaller than a wavelength of an electromagnetic wave. Thus, the collection of the unit structures functions as an electromagnetic continuous medium. By controlling the magnetic permeability and a dielectric constant by the structure of the metal pattern layer, a refractive index (a phase velocity) and the impedance can be controlled independently. Consequently, the distance between a wave source and the metasurface can be shortened, and further impedance matching can be achieved.

Further, in this embodiment, the cover member 5 is provided on the upper side portion of the back cover 1. However, the metasurface 31 suppresses the decrease in antenna radiation characteristics by the cover member 5, such as a glass, to improve antenna performance.

2. Second Embodiment

In the first embodiment, the metasurfaces are opposed to the electromagnetic wave transmission path in the layering direction between which the pictorial pattern layer is interposed. However, the metasurfaces may be arranged between the pictorial pattern layer and the electromagnetic wave transmission path in the layering direction, and may be opposed to the electromagnetic wave transmission path in the layering direction. In this case, the entire antenna structure is arranged on one side of the pictorial pattern layer.

Such an embodiment will be described as the second embodiment.

Figure 3:
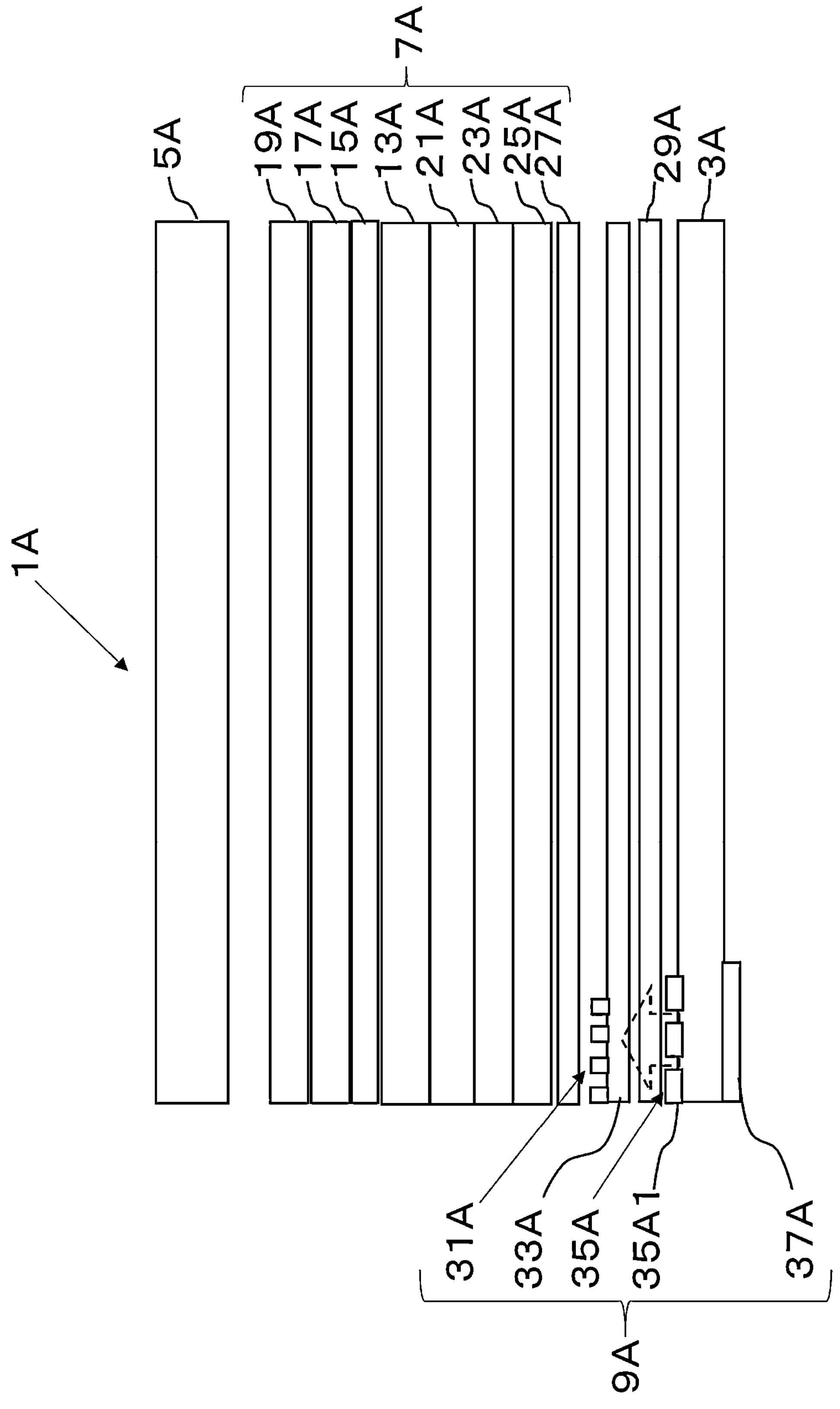
FIG. 3 is a schematic cross-sectional view of a back cover according to a second embodiment.

(1) Basic Configuration A back cover 1A (an example of a cover with antenna function) according to the second embodiment will be described with reference to FIG. 3. FIG.

3 is a schematic cross-sectional view of the back cover according to the second embodiment.

The back cover 1A constitutes a chassis mounted on a rear face side of a display unit of the electronic device or a back surface thereof. The back cover 1A mainly includes a cover member 5A and a pictorial pattern layer 7A. The back cover 1A is used in combination with a substrate 3A on which an array antenna 35A is formed. Note that the upper side of FIG. 1 is outside the electronic device, and the lower side of FIG. 1 is inside (the display unit side) the electronic device.

(2) Substrate

The substrate 3A (an example of a substrate) is a main board Printed Circuit Board (PCB) formed in a flat plate shape.

(3) Cover Member

The cover member 5A (an example of a cover layer) is arranged on the upper side in the layering direction of the substrate 3A. The cover member 5A is, for example, a cover glass. The cover member 5A may be a resin or a hard coat.

The thickness of the cover member 5A is, for example, 0.65 mm.

(4) Pictorial Pattern Layer

The pictorial pattern layer 7A (an example of a pictorial pattern layer) entirely has an integrated film configuration, and is arranged between the substrate 3A and the cover member 5A.

The pictorial pattern layer 7A includes a PET film 13A as a base substrate. The thickness of the PET film 13A is, for example, 0.1 μm.

The pictorial pattern layer 7A includes a metal vapor deposition layer 15A, a first design layer 17A, and an adhesive layer 19A arranged on the upper side of the PET film 13A. They are layered from bottom to top in the order described above. The metal vapor deposition layer 15A is made of, for example, ZnS, Al, Ag, Au, Ni, and Pt. The first design layer 17A is made of, for example, design ink, a film, and a resin. The thickness of the metal vapor deposition layer 15A is, for example, 0.1 μm, the thickness of the first design layer 17A is, for example, 1 μm, and the thickness of the adhesive layer 19A is, for example, from 3 to 4 μm.

The thickness of the metal vapor deposition layer 15A is preferably 0.1 μm (100 nm) or less. This allows maintaining performance of an antenna structure 9A and achieving metallic design of the back cover 1. The thickness of the metal vapor deposition layer 15A is preferably 50 nm or more or 90 nm or more. This allows achieving the metallic design of the back cover 1.

The pictorial pattern layer 7A includes a second design layer 21A, a base color layer 23A, a backup layer 25A, and an adhesive layer 27A arranged on the lower side of the PET film 13. They are layered from top to bottom in the order described above. The second design layer 21A is made of, for example, design ink, a film, and a resin. The thickness of the second design layer 21A is, for example, 1 μm, the thickness of the base color layer 23A is, for example, 1 μm, and the A thickness of the backup layer 25 is, for example, 1 μm. The thickness of the adhesive layer 27A is, for example, 100 μm.

Note that the configuration of the pictorial pattern layer, the thickness of each layer, or the material of each layer is not particularly limited. For example, some of the plurality of layers may be omitted, or a different layer may be added.

(5) Antenna Structure

Figure 4:
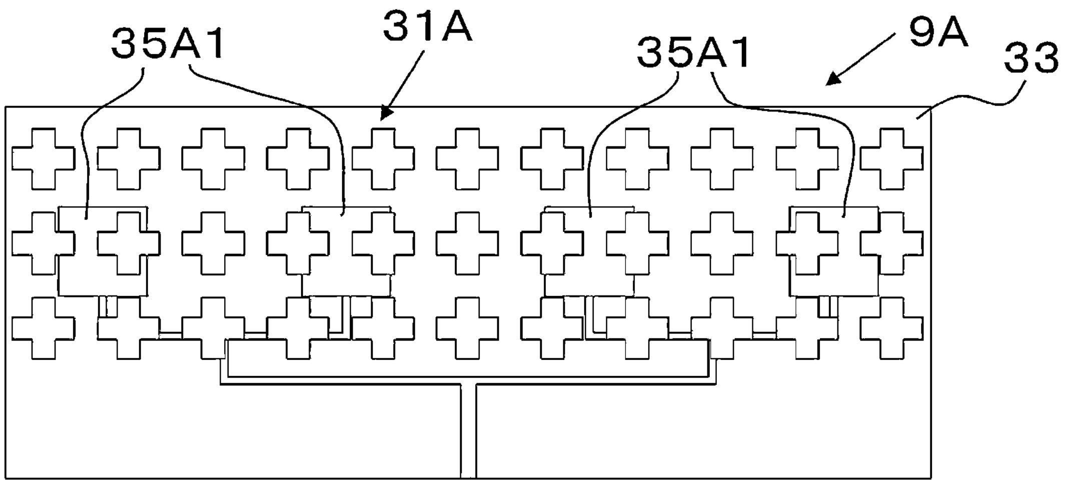
FIG. 4 is a plan view of an array antenna and a metasurface.
Figure 5:
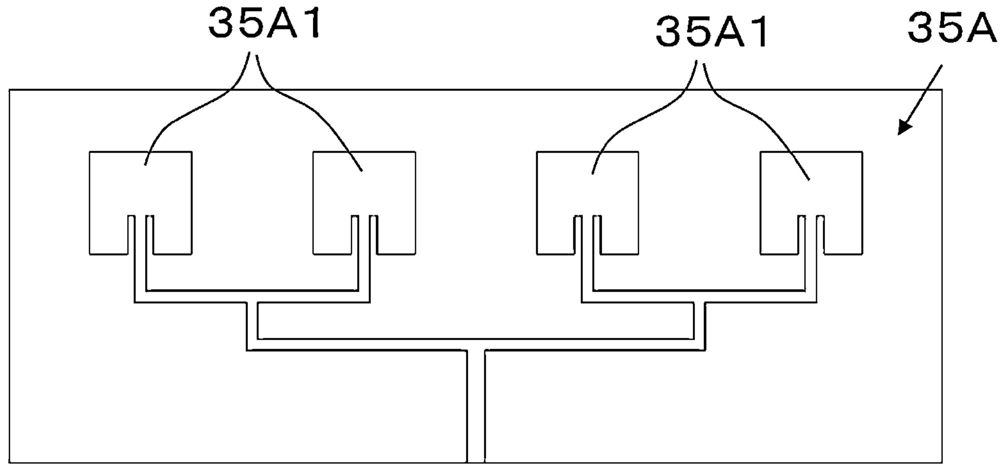
FIG. 5 is a plan view of the array antenna.

The antenna structure 9A will be described with reference to FIG. 3 to FIG. 5. FIG. 4 is a plan view of an array antenna and the metasurface. FIG. 5 is a plan view of the array antenna.

The antenna structure 9A is a 5G antenna.

The antenna structure 9A includes the array antenna 35A. The array antenna 35A is formed on the upper surface of the substrate 3A. As illustrated in FIG. 4, the array antenna 35A includes a plurality of patch antennas 35A1.

The antenna structure 9A includes a feed line 37A (an example of an electromagnetic wave transmission path). The feed line 37A is formed on the lower surface of the substrate 3A. The feed line 37A is formed at a position corresponding to the array antenna 35A in plan view.

The feed line 37A is, for example, a microstrip line and supplies the high-frequency signal RF to the array antenna 35A. Note that the feed line 37A is connected to a peripheral circuit (not illustrated). Further, the feed line 37A and the array antenna 35A are connected with, for example, a connector.

The back cover 1A includes a low-loss film 33A. The low-loss film 33A is arranged between the pictorial pattern layer 7A and the substrate 3A. An adhesive layer 29A is arranged between the low-loss film 33A and the substrate 3A.

The back cover 1A includes metasurfaces 31A (an example of metasurfaces). As illustrated in FIG. 5, the metasurfaces 31A are formed at a position corresponding to the array antenna 35A in plan view.

The metasurfaces 31A are formed as a conductive member on the low-loss film 33A. The metasurface 31A is made of copper in this embodiment.

The metasurface 31A has a shape to constitute an equivalent circuit that matches impedances between a feed unit that inputs a high frequency power to the antenna element and the antenna element.

In the basic structure of this embodiment, since the pictorial pattern layer 7A in the back cover 1A is arranged on the upper side of the antenna structure 9A, attenuation occurs, and thus antenna radiation characteristics is possibly reduced.

Additionally, in the basic structure of this embodiment, the cover member 5A is arranged on the upper side of the antenna structure 9A, and thus attenuation possibly occurs.

Thus, in this embodiment, the metasurfaces 31A are arranged on the upper side of the array antenna 35A to suppress the decrease in antenna radiation characteristics by the cover member 5A. In addition, the metasurface 31A constitutes the equivalent circuit that matches the impedances between the feed unit that inputs the high frequency power to the antenna element and the antenna element. Therefore, the antenna performance is improved. This allows obtaining the highly directional and high-gain antenna.

As described above, in this embodiment, the back cover 1A includes the metasurfaces 31A to achieve the designed back cover as a stand-alone product, and is used in combination with the substrate 3A on which the array antenna 35A is formed.

3. Third Embodiment

Figure 6:
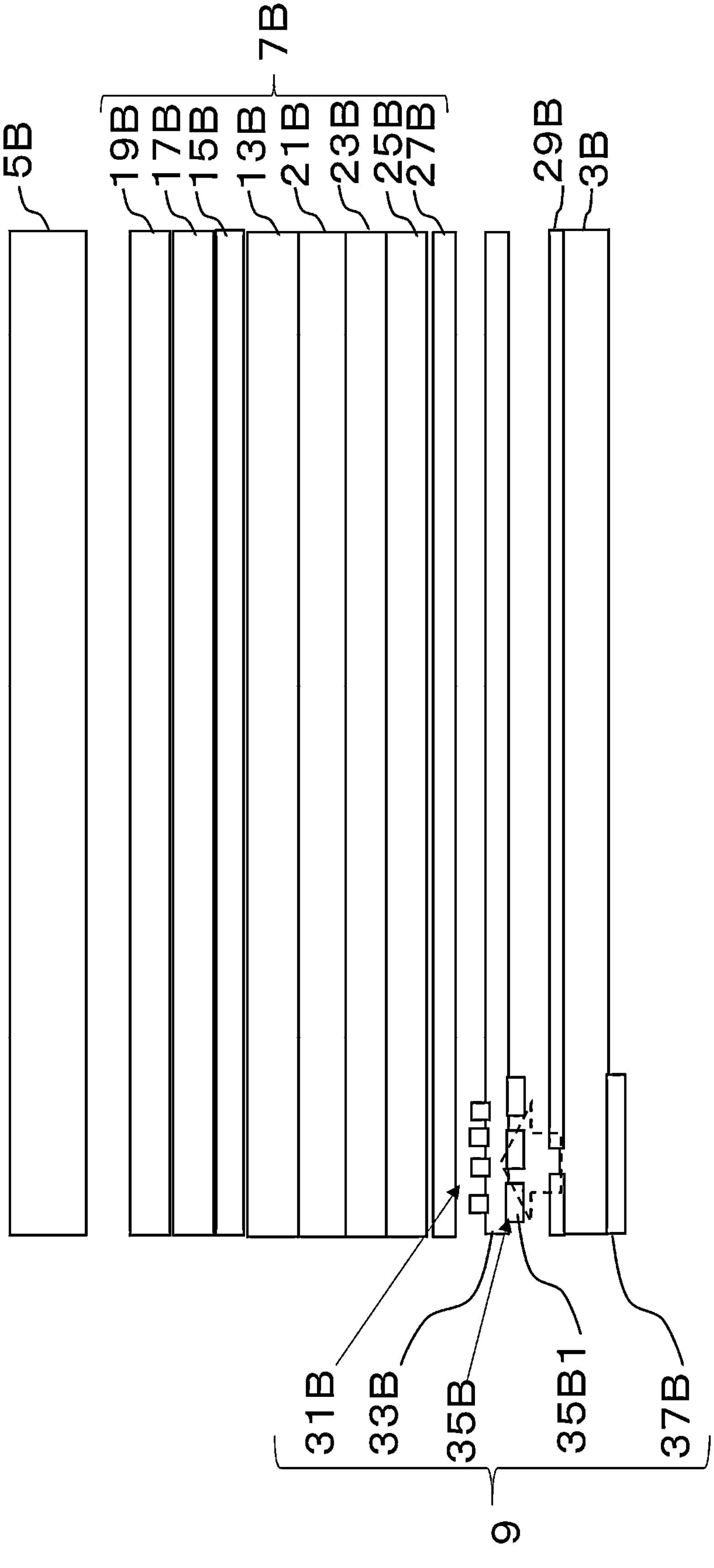
FIG. 6 is a schematic cross-sectional view of a back cover according to a third embodiment.

As a modified example of the second embodiment, the third embodiment will be described with reference to FIG. 6. FIG. 6 is a schematic cross-sectional view of a back cover according to the third embodiment.

The basic configuration is the same as that of the second embodiment, and thus the antenna structure will be mainly described.

In this embodiment, the designed back cover as a stand-along product is achieved by a cover member 5B, a pictorial pattern layer 7B, a low-loss film 33B, meta/surfaces 31B, and an array antenna 35B, and is used in combination with the substrate 3 on which a feed line 37B and the array antenna 35B are formed.

An antenna structure 9B is a 5G antenna.

The antenna structure 9B includes the low-loss film 33B. The low-loss film 33B is arranged between the pictorial pattern layer 7B and a substrate 3B. An adhesive layer 29B is arranged between the low-loss film 33B and the substrate 3B.

The antenna structure 9B includes the array antenna 35B. The array antenna 35B is formed on the lower surface of the low-loss film 33B. The array antenna 35B includes a plurality of patch antennas 35B1.

The antenna structure 9B includes the feed line 37B (an example of an electromagnetic wave transmission path). The feed line 37B is formed on the lower surface of the substrate 3B.

The feed line 37B is, for example, a microstrip line and supplies the high-frequency signal RF to the array antenna 35B. Note that the feed line 37B is connected to a peripheral circuit (not illustrated). Additionally, the feed line 37B and the array antenna 35B are connected by contactless power feed. Therefore, unlike the second embodiment, for example, the connector is not required.

The antenna structure 9B includes metasurfaces 31B (an example of metasurfaces). The metasurfaces 31B are formed on the upper surface of the low-loss film 33B as a conductive member. The metasurfaces 31B are formed at a position corresponding to the array antenna 35B in plan view.

The metasurface 31B is made of copper in this embodiment.

In this embodiment, the designed back cover as the stand-along product is achieved by the cover member 5B, the pictorial pattern layer 7B, the low-loss film 33B, the meta/surfaces 31B, and the array antenna 35B, and is used in combination with the substrate 3 on which the feed line 37B and the array antenna 35B are formed.

4. Fourth Embodiment

Figure 7:
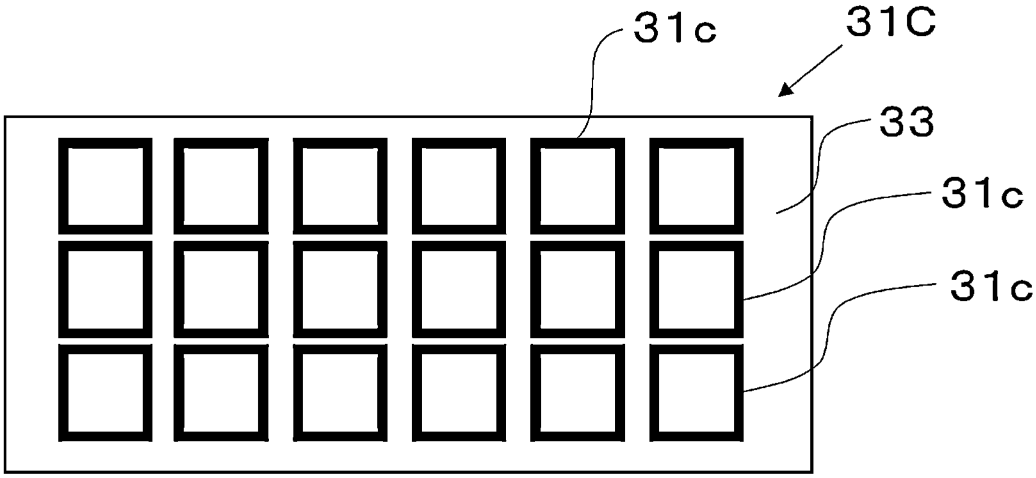
FIG. 7 is a schematic plan view illustrating a pattern shape of a metasurface according to a fourth embodiment.

A modified example of a pattern shape used for a metasurface will be described as a fourth embodiment with reference to FIG. 7. FIG. 7 is a schematic plan view illustrating the pattern shape of the metasurface according to the fourth embodiment.

A metasurface 31C is formed of a plurality of conductive members 31*c* formed on the surface of the low-loss film 33. The conductive member 31*c* has a quadrangular (specifically, a square) frame shape.

5. Fifth Embodiment

Figure 8:
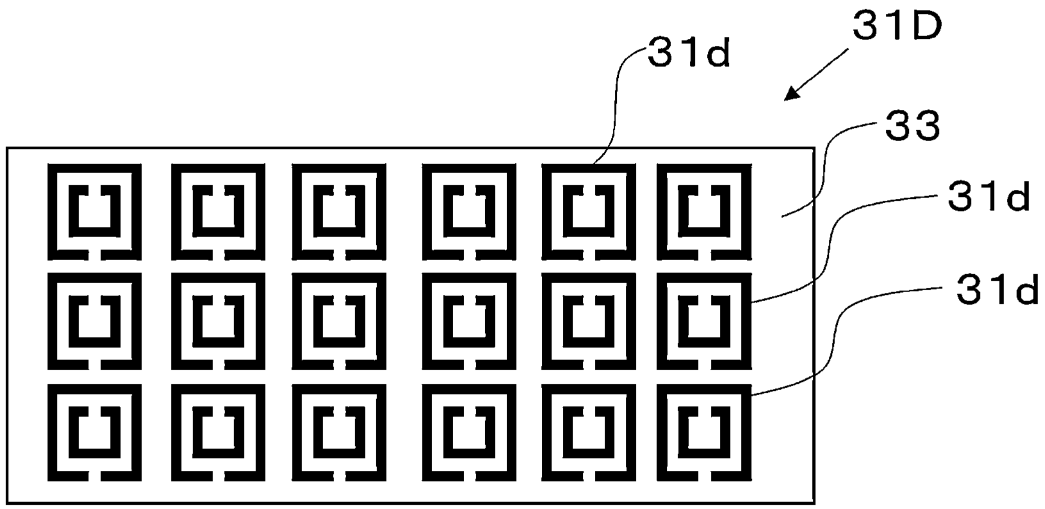
FIG. 8 is a schematic plan view illustrating a pattern shape of a metasurface according to a fifth embodiment.

A modified example of a pattern shape used for a metasurface will be described as a fifth embodiment with reference to FIG. 8. FIG. 8 is a schematic plan view illustrating the pattern shape of the metasurface according to the fifth embodiment.

A metasurface 31D is formed of the plurality of conductive members 31*c* formed on the surface of the low-loss film 33. A conductive member 31*d* has a double quadrangular (specifically, a square) frame shape. The inner and outer quadrangles have cut portions at the opposite positions.

6. Sixth Embodiment

Figure 9:
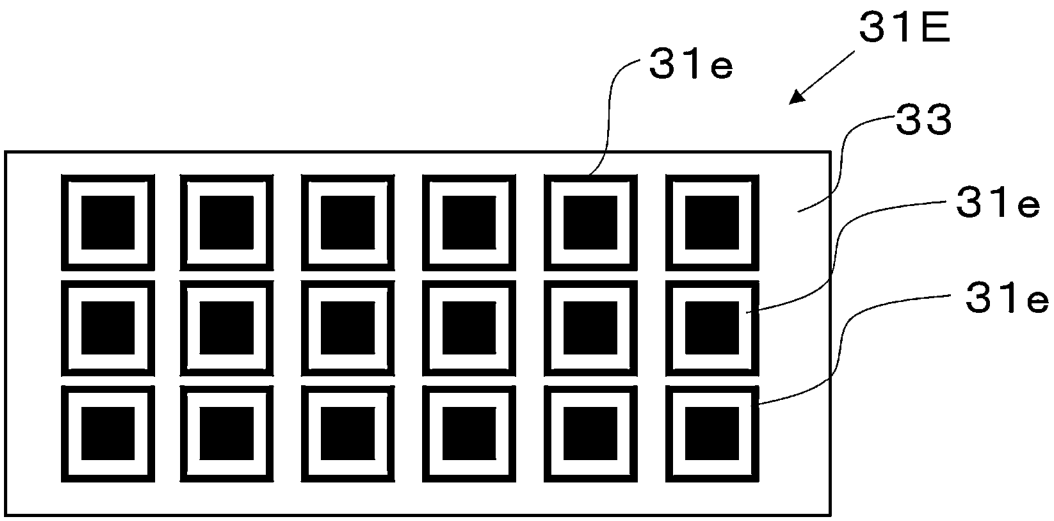
FIG. 9 is a schematic plan view illustrating a pattern shape of a metasurface according to a sixth embodiment.

A modified example of a pattern shape used for a metasurface will be described as a sixth embodiment with reference to FIG. 9. FIG. 9 is a schematic plan view illustrating the pattern shape of the metasurface according to the sixth embodiment.

A metasurface 31E is formed of a plurality of conductive members 31*e* formed on the surface of the low-loss film 33. The conductive member 31*e* has an outer quadrangular (specifically, a square) frame shape and an inner filled quadrangular (specifically, a square) shape.

7. Seventh Embodiment

Figure 10:
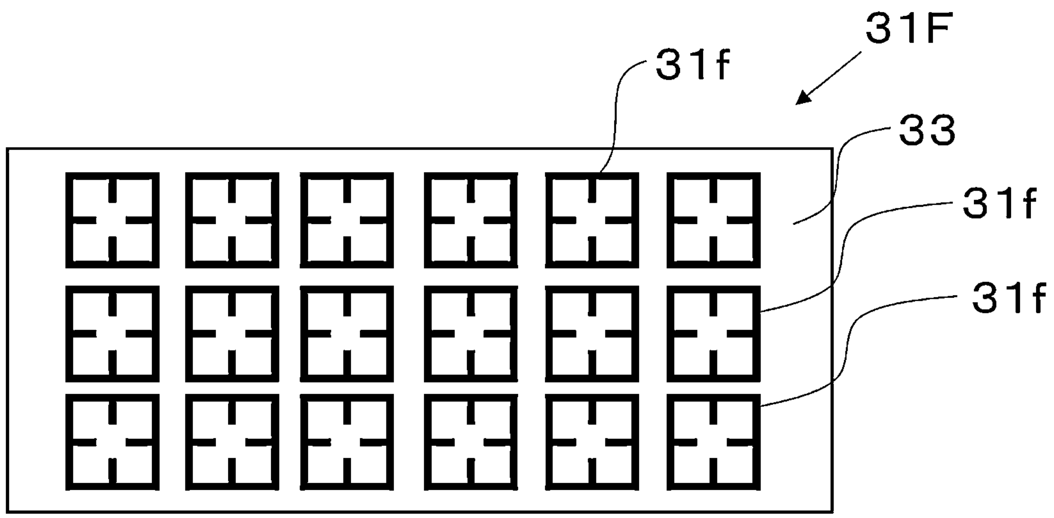
FIG. 10 is a schematic plan view illustrating a pattern shape of a metasurface according to a seventh embodiment.

A modified example of a pattern shape used for a metasurface will be described as a seventh embodiment with reference to FIG. 10. FIG. 10 is a schematic plan view illustrating the pattern shape of the metasurface according to the fourth embodiment.

A metasurface 31F is formed of the plurality of conductive members 31*e* formed on the surface of the low-loss film 33. A conductive member 31*f* has a quadrangular (specifically, a square) frame shape and projections portion extending inward from respective sides.

8. Eighth Embodiment

While the plurality of conductive members of the metasurfaces have the relatively simple shapes in the first to seventh embodiments, the shape of the conductive member is not particularly limited.

To thin the thickness of the back cover, increasing the number of conductive members of the metasurface and complicating the pattern shape are preferred to facilitate the configuration of the equivalent circuit that matches the impedance.

Figure 11:
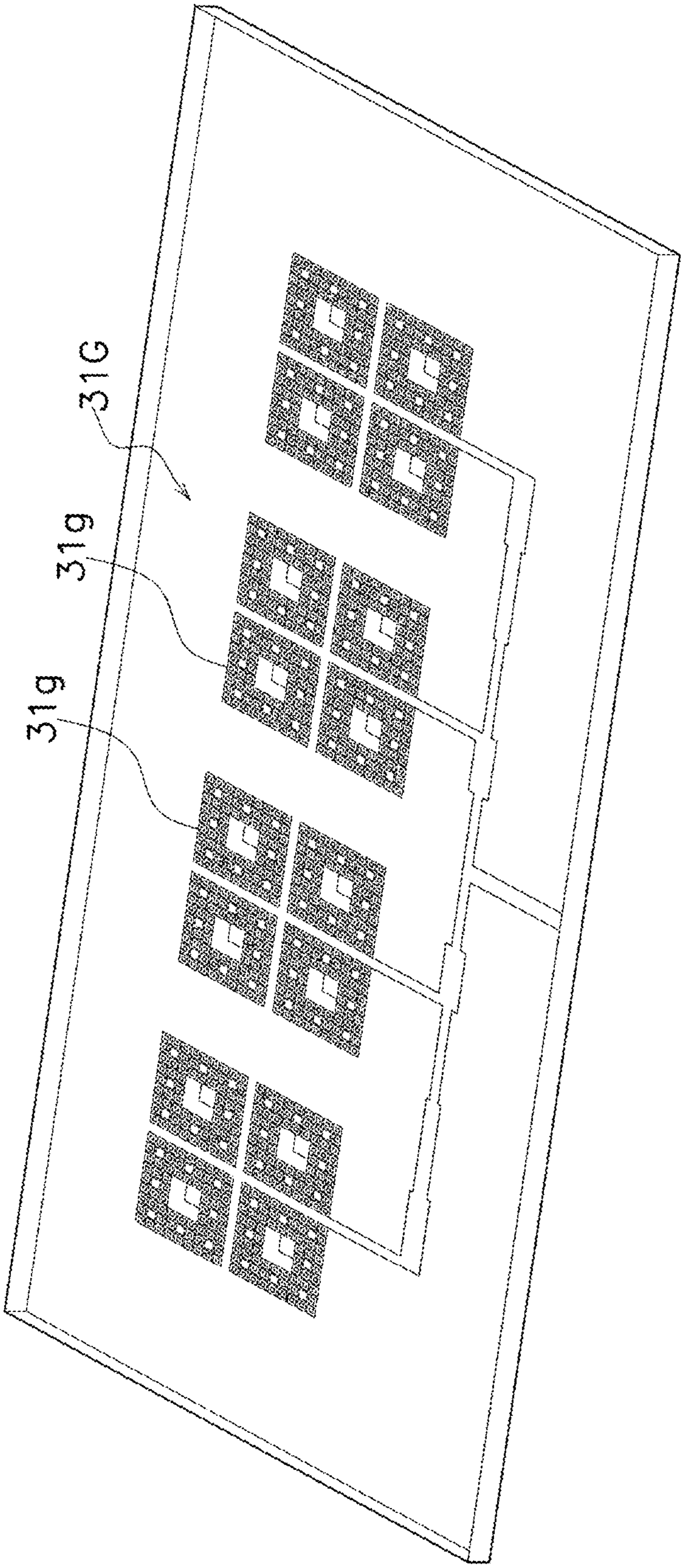
FIG. 11 is a schematic perspective view illustrating a pattern shape of a metasurface according to an eighth embodiment.
Figure 12:
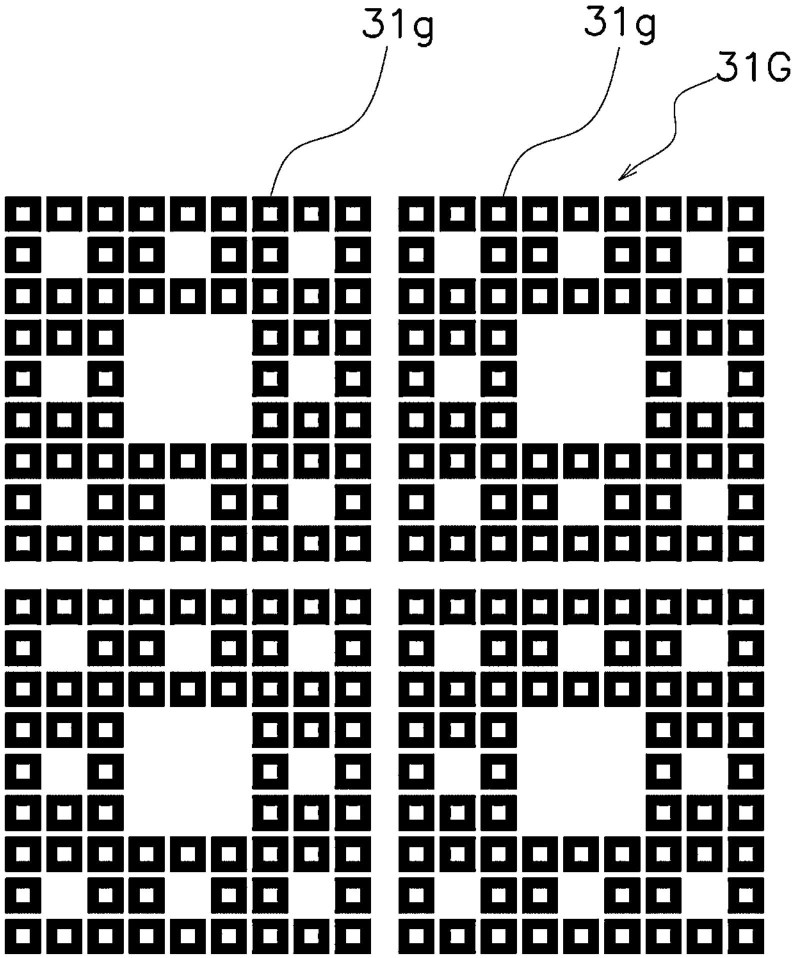
FIG. 12 is a schematic plan view illustrating the pattern shape of the metasurface.
Figure 13:
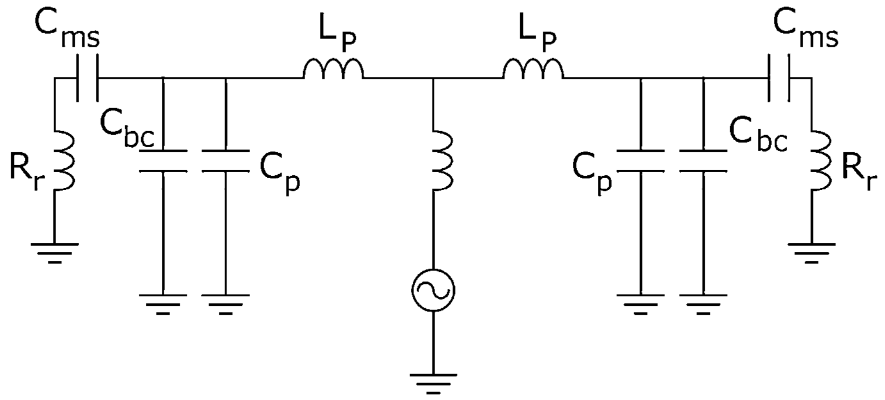
FIG. 13 is an equivalent circuit diagram of an antenna structure.

Such an embodiment will be described as the eighth embodiment with reference to FIG. 11 to FIG. 13. FIG. 11 is a schematic perspective view illustrating the pattern shape of the metasurface according to the eighth embodiment. FIG. 12 is a schematic plan view illustrating the pattern shape of the metasurface. FIG. 13 is an equivalent circuit diagram of an antenna structure.

In this embodiment, a conductive member 31*g* of a metasurface 31G has a fractal shape. The fractal refers to one in which a diagram portion and the entire portion are self-similar (recursion).

Specifically, the conductive member 31*g* of the metasurface 31G has the shape formed of a large number of self-similar quadrangles. Note that the minimum unit of the conductive member 31*g* is a quadrangular conductive member, and the conductive members have a quadrangular portion in which the conductive member is not formed in the middle.

As described above, by shaping the conductive member 31*g* in the fractal shape, the antenna performance is improved. This is because, with the fractal shape, as illustrated in FIG. 13, the variation of the equivalent circuit increases, and a dynamic range of a constant of each component in the equivalent circuit can be widely used.

Figure 14:
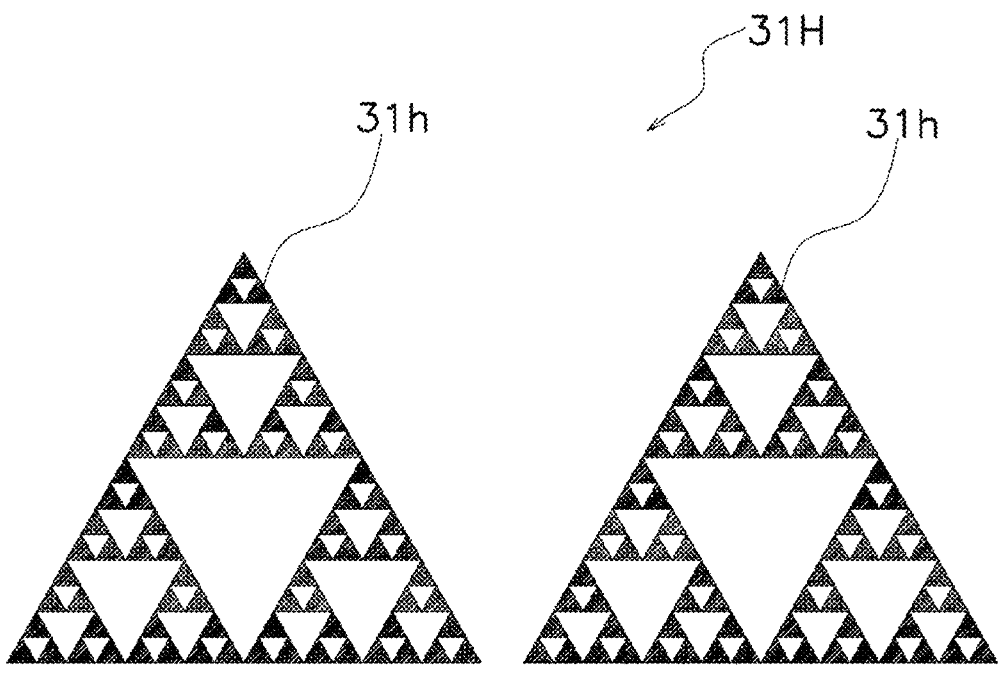
FIG. 14 is a is a schematic plan view illustrating a pattern shape of a metasurface according to a modified example.

A modified example will be described with reference to FIG. 14. FIG. 14 is a is a schematic plan view illustrating a pattern shape of a metasurface according to the modified example.

In this modified example, a conductive member 31*h* of a metasurface 31H has a fractal shape. Specifically, the conductive member 31*h* is a diagram formed of countless self-similar triangles.

Note that the minimum unit of the conductive member 31*h* is the triangular conductive member, and a triangular portion in the reverse direction where the conductive member is not formed is present between the three conductive members in the same direction.

The shape of the fractal is not limited to the example described above.

Note that, in the layer configuration (FIG. 1) of the back cover according to the first embodiment, the pattern shape of the metasurface may be fractal. In this case, the magnetic permeability can be a negative value, and further an equivalent circuit that allows impedance matching can be configured. Thus, the amount of signal attenuation in the antenna structure can be reduced. As a result, the decrease in performance of the 5G antenna is suppressed.

Further, in the layer configuration (FIG. 3) of the back cover according to the second embodiment, the pattern shape of the metasurface may be fractal. In this case, an effect of suppressing the decrease in antenna radiation characteristics by the cover member 5A is increased.

Further, in the layer configuration (FIG. 6) of the back cover according to the third embodiment, the pattern shape of the metasurface may be fractal. This suppresses the decrease in antenna radiation characteristics by the cover member 5B.

9. Ninth Embodiment

Figure 15:
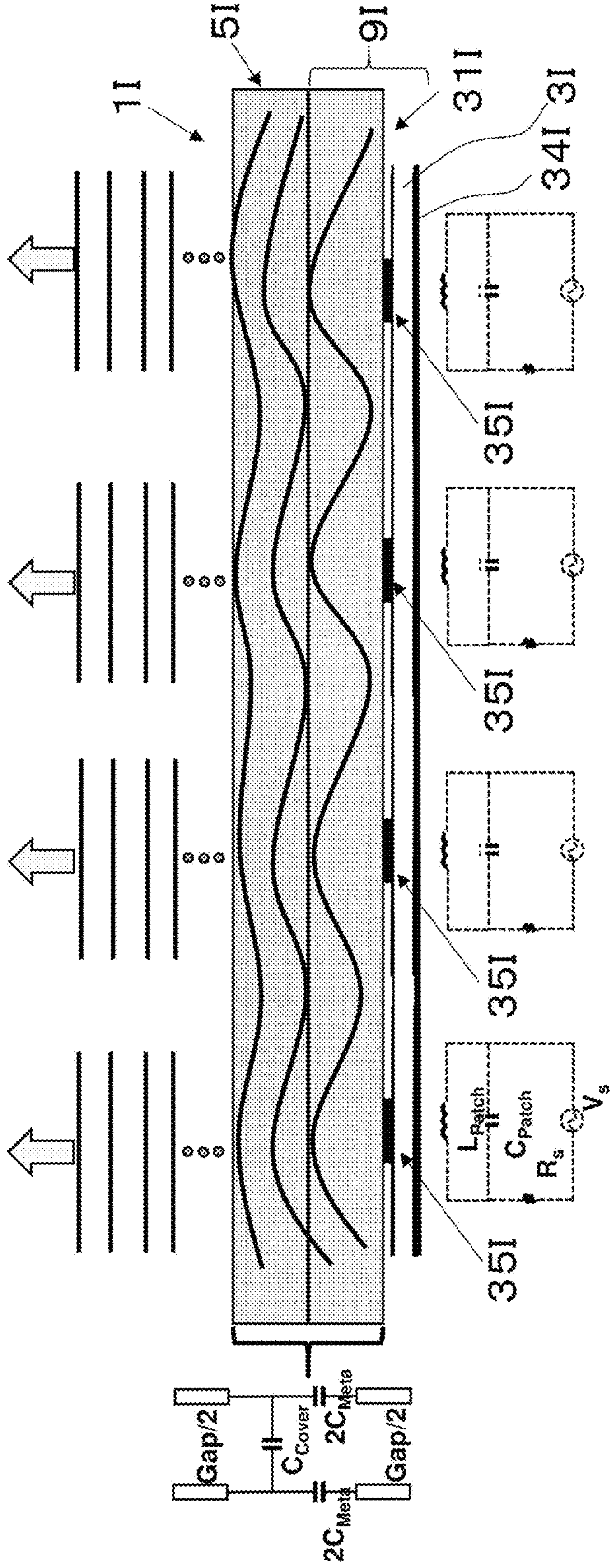
FIG. 15 is a schematic cross-sectional view of a cover with antenna function according to a ninth embodiment.
Figure 16:
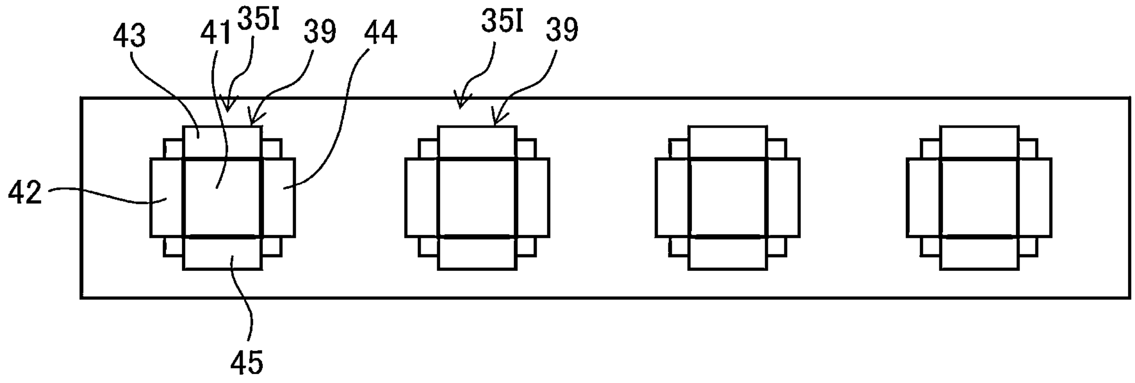
FIG. 16 is a plan view of an array antenna.
Figure 17:
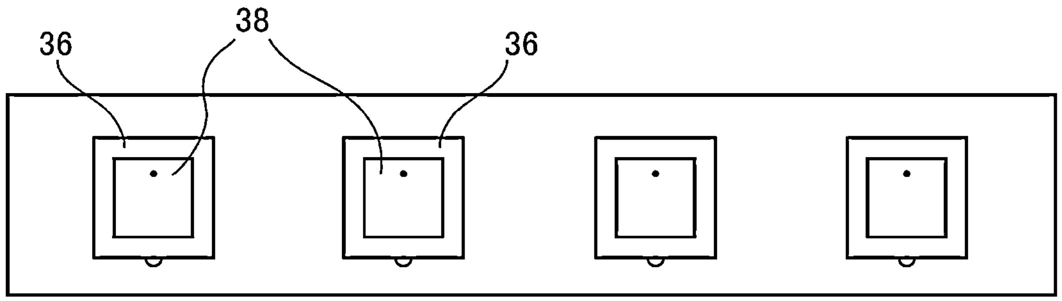
FIG. 17 is a plan view of high-frequency patches and low-frequency patches.
Figure 18:
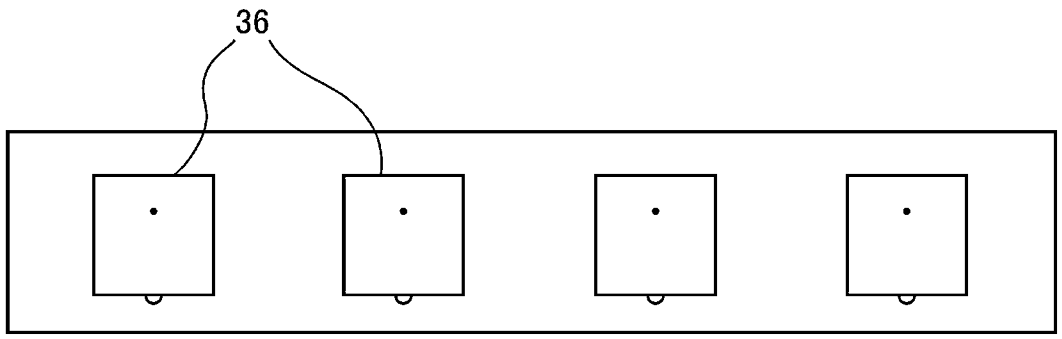
FIG. 18 is a plan view of the low-frequency patches.
Figure 19:
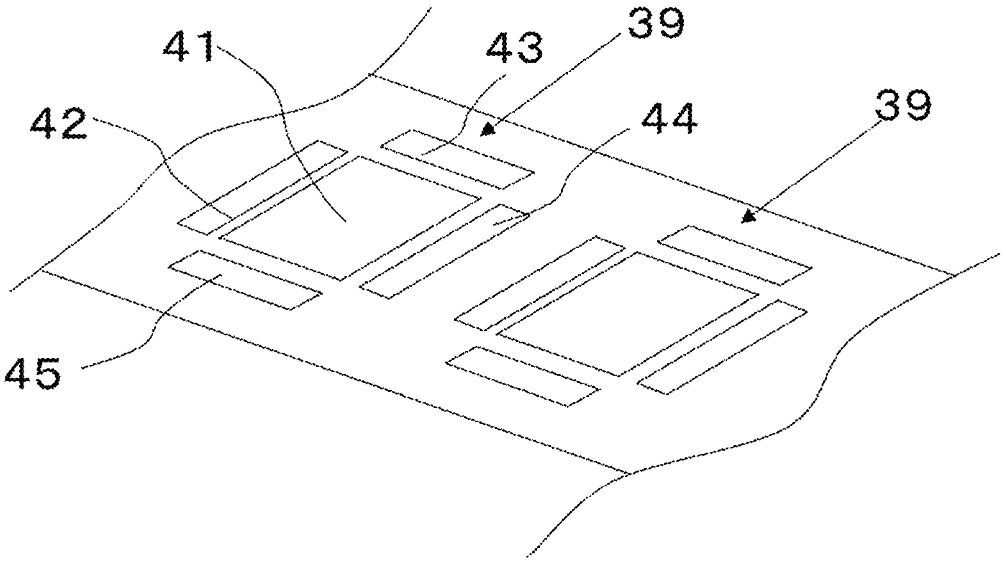
FIG. 19 is a perspective view of impedance adjustment patches.

An antenna structure 9I of a back cover 1I according to the ninth embodiment will be described with reference to FIG. 15 to FIG. 19. FIG. 15 is a schematic cross-sectional view of a cover with antenna function according to the ninth embodiment. FIG. 16 is a plan view of an array antenna. FIG. 17 is a plan view of high-frequency patches and low-frequency patches. FIG. 18 is a plan view of the low-frequency patches. FIG. 19 is a perspective view of impedance adjustment patches. Note that a cover member 5I (described later) of the back cover 1I is, similarly to the cover member 5A according to the second embodiment, includes metasurfaces 31I (described later), and is used in combination with a substrate 31 (described later) on which array antennas 35I (described later) are formed.

However, an adhesive layer may be an air layer or another layer (for example, a resin layer).

The antenna structure 9I handles multiple bands (specifically, a dual band), and is a 5G antenna for single polarization.

FIG. 15 schematically illustrates the array antennas 35I, the metasurface 31I, and the cover member 5I. A plurality of the array antennas 35I are formed on the upper surface of the substrate 3I. A ground electrode 34I is formed on a second surface of the substrate 3I. On the lower side of FIG. 1, an equivalent circuit (a resonant LC circuit) of each array antenna 35I is illustrated. Further, on the left side of FIG. 15, an equivalent circuit of the metasurface 31I and the back cover 1I is illustrated.

In the equivalent circuit on the left side of FIG. 15, two $2C_{Meta}$ by each metasurface 31I are arranged in parallel, and $C_{cover}$ connects between them. Appropriately adjusting the shape and number of the metasurfaces 31I allows changing values of the two $2C_{Meta}$. This allows matching impedances between the equivalent circuit of the array antennas 35I and the equivalent circuit of the metasurfaces 31I and the cover member 5I.

The antenna structure 9I includes the array antennas 35I described above. Each of the array antennas 35I includes, in the order from bottom to top, a low-frequency patch 36, a high-frequency patch 38, and an impedance adjustment patch 39 between which, for example, a resin layer is interposed.

As illustrated in FIG. 18, the low-frequency patch 36 has a square shape in plan view. The low-frequency patch 36 is a patch that emits a low-frequency (for example, 28 GHz) signal.

The high-frequency patch 38 is a patch that emits a high frequency (for example, 38 GHz) signal. As illustrated in FIG. 17, the high-frequency patch 38 has a square shape in plan view, and is provided at a position overlapping with the low-frequency patch 36 in plan view. Note that the high-frequency patch 38 has a smaller area than the low-frequency patch 36.

The impedance adjustment patch 39 is provided at a position overlapping with the low-frequency patch 36 and the high-frequency patch 38 in plan view. As illustrated in FIG. 19, the impedance adjustment patch 39 includes a first patch 41 and second to fifth patches 42 to 45.

The first patch 41 has a square shape in plan view and is formed on the upper surface of the substrate 3I. The first patch 41 has a position and an area generally corresponding to the high-frequency patch 38. The respective second to fifth patches 42 to 45 are formed on the upper surface of the substrate 3I and are arranged in the proximity of the four sides of the first patch 41, and have a rectangular shape in plan view. The second to fifth patches 42 to 45 have positions and areas generally corresponding to the four side portions of the low-frequency patch 36.

Note that contactless power feed may be employed for the antenna structure, or a feed line and an array antenna may be connected.

The shapes, the numbers, and the mutual positional relationship of the low-frequency patches and the high-frequency patches are not particularly limited. For example, both may be provided side by side on the same surface.

Figure 20:
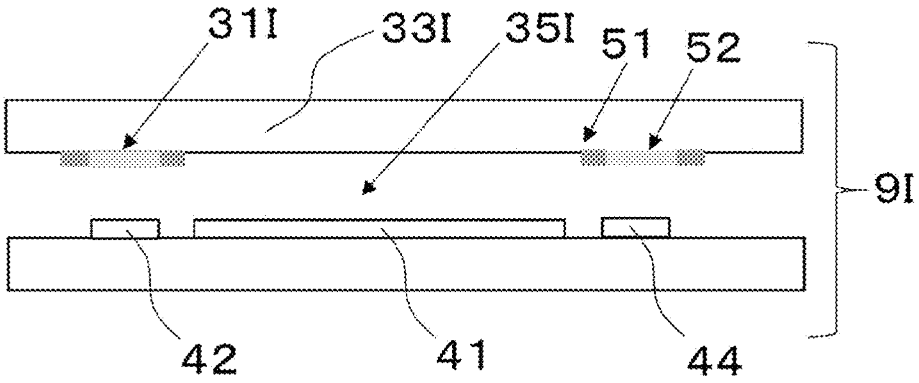
FIG. 20 is a schematic cross-sectional view illustrating a correspondence relationship between a metasurface and an array antenna.
Figure 21:
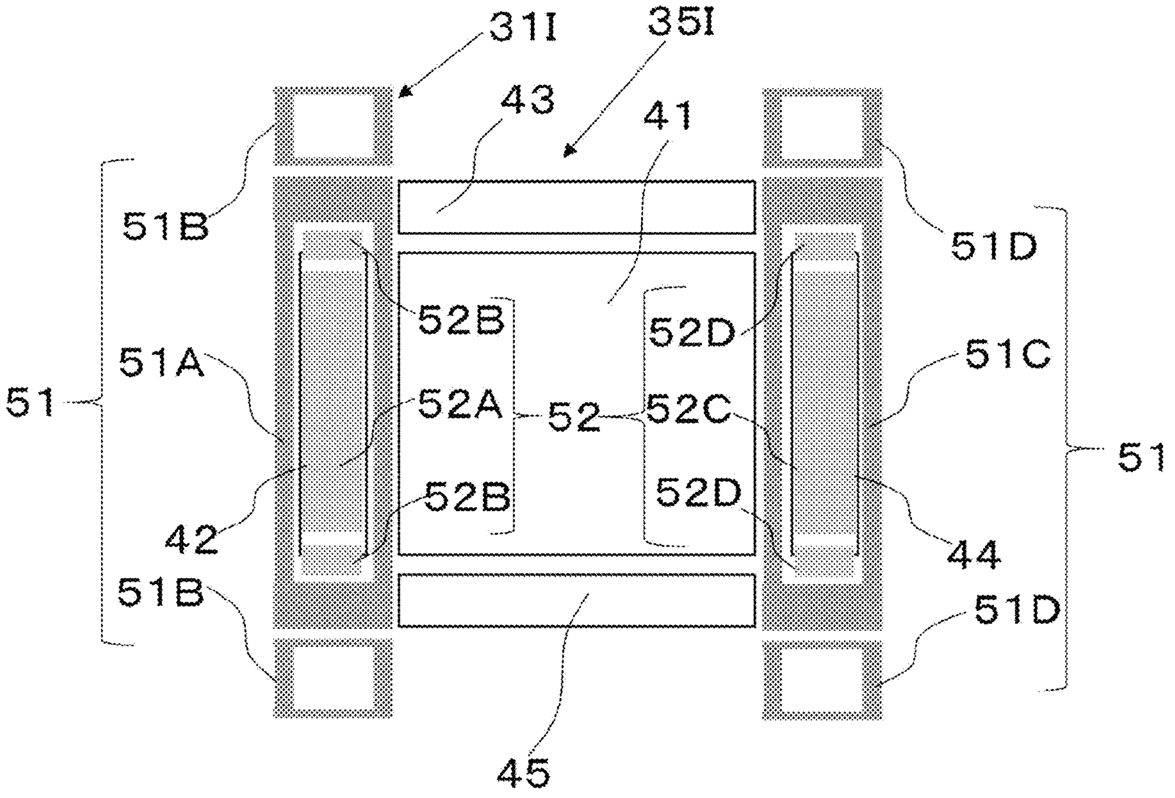
FIG. 21 is a schematic plan view illustrating the correspondence relationship between the metasurface and the array antenna.
Figure 22:
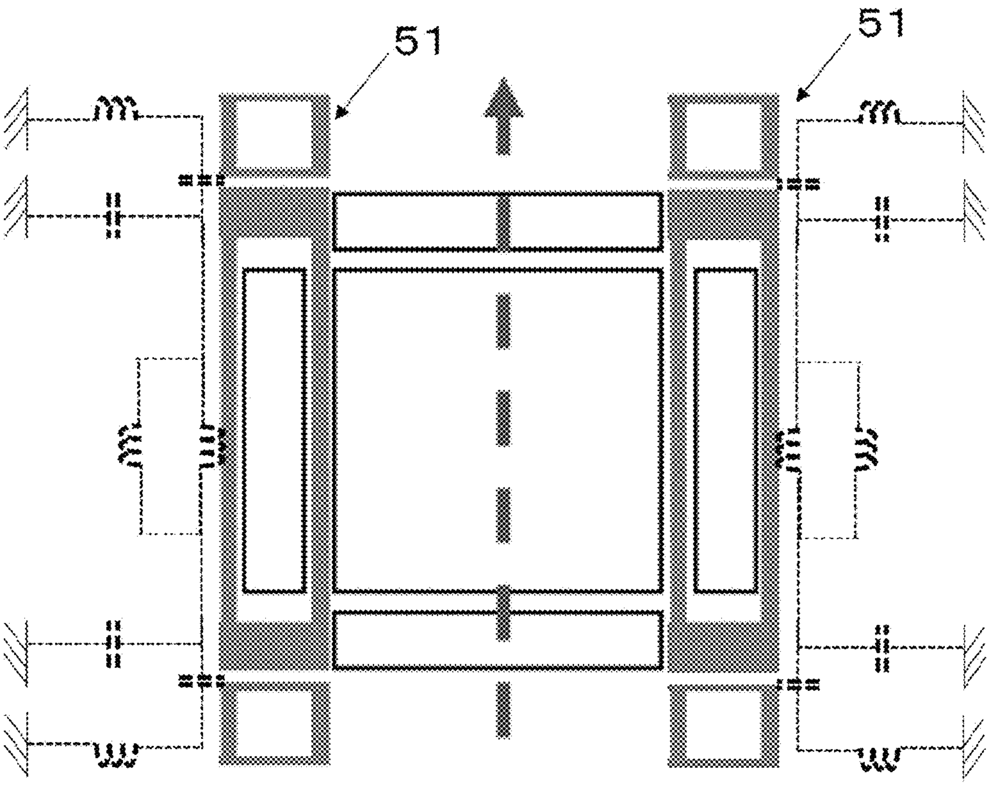
FIG. 22 is a schematic plan view of a first pattern of the metasurface including an equivalent circuit.
Figure 23:
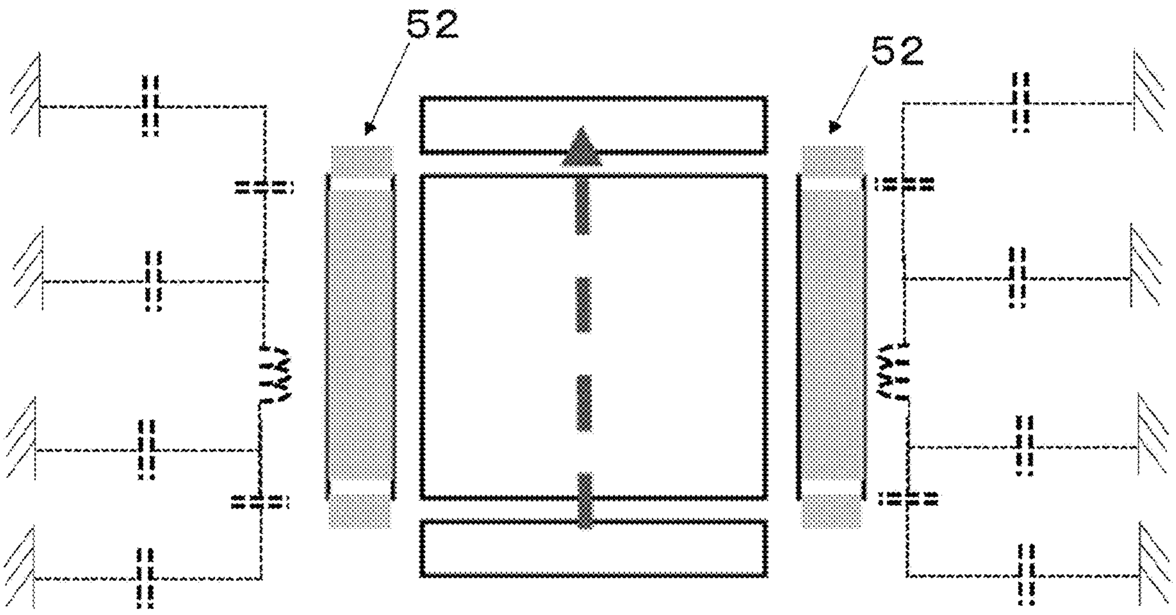
FIG. 23 is a schematic plan view of a second pattern of the metasurface including an equivalent circuit.

With reference to FIG. 20 to FIG. 23, a configuration of a metasurface will be described. FIG. 20 is a schematic cross-sectional view illustrating a correspondence relationship between the metasurface and the array antenna. FIG. 21 is a schematic plan view illustrating the correspondence relationship between the metasurface and the array antenna. FIG. 22 is a schematic plan view of the first pattern of the metasurface including an equivalent circuit. FIG. 23 is a schematic plan view of the second pattern of the metasurface including an equivalent circuit.

As illustrated in FIG. 20, a metasurface 31I (an example of a metasurface) is formed at a position corresponding to the array antenna 35I in plan view on a low-loss film 33I of the back cover 1I. The metasurface 31I is a conductive member and is made of copper in this embodiment. Note that the low-loss film 33I is made of, for example, a cycloolefin polymer (COP) resin.

The metasurface 31I has a shape to constitute the equivalent circuit that matches impedances between a feed unit that inputs a high frequency power to the antenna element and the antenna element. Hereinafter, the pattern of the metasurface 31I will be specifically described.

As illustrated in FIG. 20 to FIG. 22, the metasurface 31I includes a first pattern 51 for low frequency. The first pattern 51 is illustrated in dark gray, and in plan view, includes a first main pattern 51A corresponding to the second patch 42 and a pair of first sub-patterns 51B separately provided at both ends. Furthermore, in plan view, the first pattern 51 includes a second main pattern 51C corresponding to a fourth patch 44 and a pair of second sub-patterns 51D separately provided at both ends.

The first main pattern 51A and the second main pattern 51C have a rectangular frame shape (a shape in which the inside is hollowed out), and are arranged so as to surround the second patch 42 and the fourth patch 44 with clearances in plan view, respectively. The pair of first sub-patterns 51B and the pair of second sub-patterns 51D also have a rectangular frame shape.

As illustrated in FIG. 20, FIG. 21, and FIG. 23, the metasurface 31I includes a second pattern 52 for high frequency. The second pattern 52 is illustrated in light gray, and in plan view, includes a third main pattern 52A corresponding to the second patch 42 and a pair of third sub-patterns 52B separately provided at both ends. Furthermore, in plan view, the second pattern 52 includes a fourth main pattern 52C corresponding to the fourth patch 44 and a pair of fourth sub-patterns 52D separately provided at both ends.

The third main pattern 52A and the fourth main pattern 52C have a rectangular solid shape (a shape inside of which is filled), and are arranged to overlap with the second patch 42 and the fourth patch 44, respectively. The pair of third sub-patterns 52B and the pair of fourth sub-patterns 52D also have a solid shape, and are arranged so as to partially overlap with end portions of the second patch 42 and the fourth patch 44, respectively.

In plan view, the third main pattern 52A and the pair of third sub-patterns 52B are arranged inside the first main pattern 51A of the first pattern 51 so as to be spaced apart.

In plan view, the fourth main pattern 52C and the pair of fourth sub-patterns 52D are arranged inside the second main pattern 51C of the first pattern 51 so as to be spaced apart.

The dashed arrows illustrated in FIG. 22 and FIG. 23 are the direction of power feed, and thus a vertical single polarization antenna is achieved.

By the arrangement described above, the equivalent circuit illustrated in FIG. 22 is formed with the first pattern 51. Also, the equivalent circuit illustrated in FIG. 23 is formed with the second pattern 52.

Using such equivalent circuits, impedance matching is performed. For example, by bringing the impedance position in a Smith Chart to the center (a fully matched position), the impedance matching is performed. Specifically, in a reference example with the cover and without the metasurface, the position of the impedance in the Smith Chart is approximated to the center of the circle at the corresponding frequency.

Figure 24:
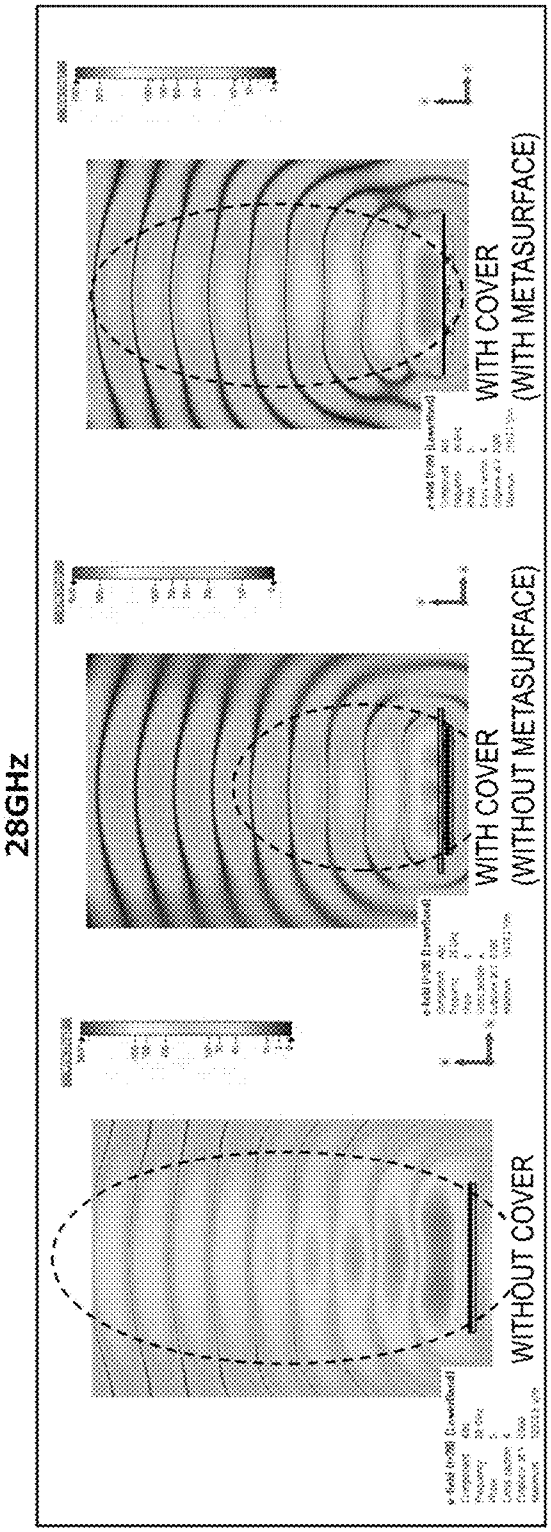
FIG. 24 is a simulation diagram in which a low-frequency radio wave distribution is compared between without the cover and with the cover (without the metasurface) and with the cover (with the metasurface).

The effect of this embodiment will be described with reference to FIG. 24 to FIG. 26. FIG. 24 is a simulation diagram in which a low-frequency electric field distribution is compared between without the cover and with the cover (without the metasurface) and with the cover (with the metasurface).

Figure 25:
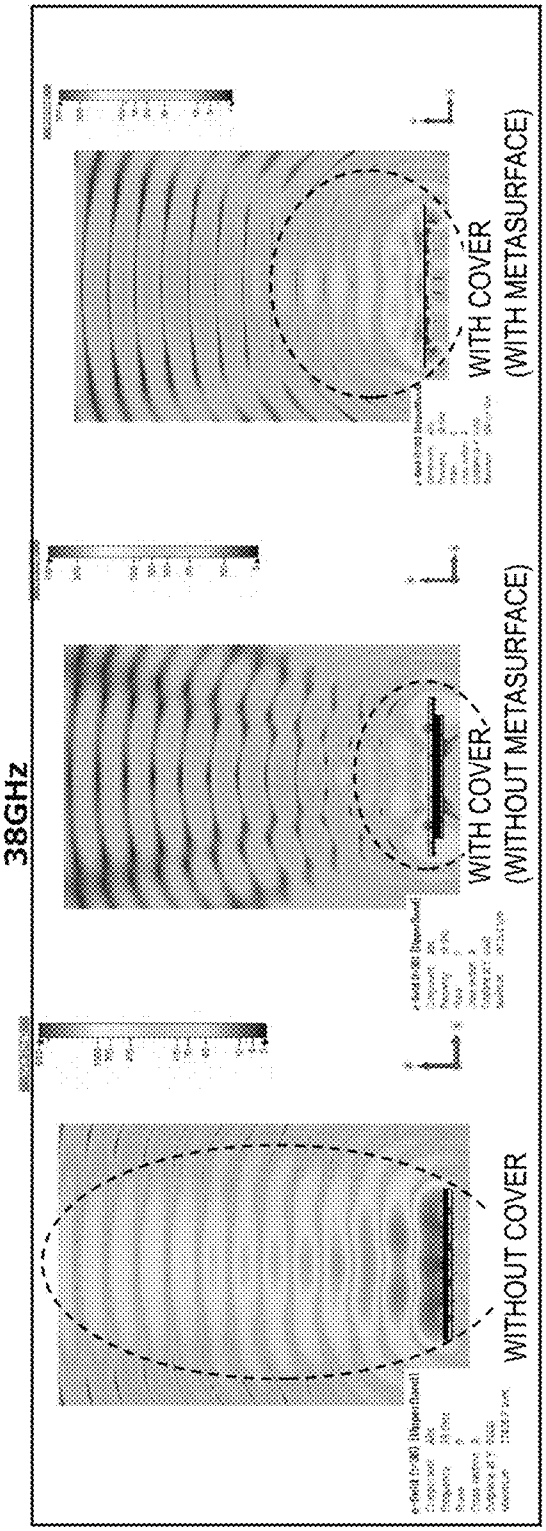
FIG. 25 is a simulation diagram in which a high-frequency electric field distribution is compared between without the cover and with the cover (without the metasurface) and with the cover (with the metasurface).

FIG. 25 is a simulation diagram in which a high-frequency electric field distribution is compared between without the cover and with the cover (without the metasurface) and with the cover (with the metasurface). FIG. 26 is a simulation diagram illustrating a return loss (a reflection loss) in this embodiment.

In the case of low frequency (for example, 28 GHz), as illustrated in FIG. 24, the left diagram is the electric field distribution without the cover, and good results are obtained. Moreover, the middle view is the electric field distribution with the cover (without the metasurface), and poor results are obtained. The right diagram is the electric field distribution with the cover (with the metasurface), and the better results are obtained than the electric field distribution in the middle in the case of with the cover (without the metasurface). Note that in the diagrams, regions where the electric fields of, for example, 2000 V/m or more are generated are surrounded by the dashed lines.

In the case of high frequency (for example, 38 GHz), as illustrated in FIG. 25, the left diagram is the electric field distribution without the cover, and good results are obtained. Moreover, the middle diagram is the electric field distribution with the cover (without the metasurface), and poor results are obtained. The right diagram is the electric field distribution with the cover (with the metasurface), and the better results are obtained than the electric field distribution in the middle in the case of with the cover (without the metasurface). Note that in the diagrams, regions where the electric fields of, for example, 2000 V/m or more are generated are surrounded by the dashed lines.

Figure 26:
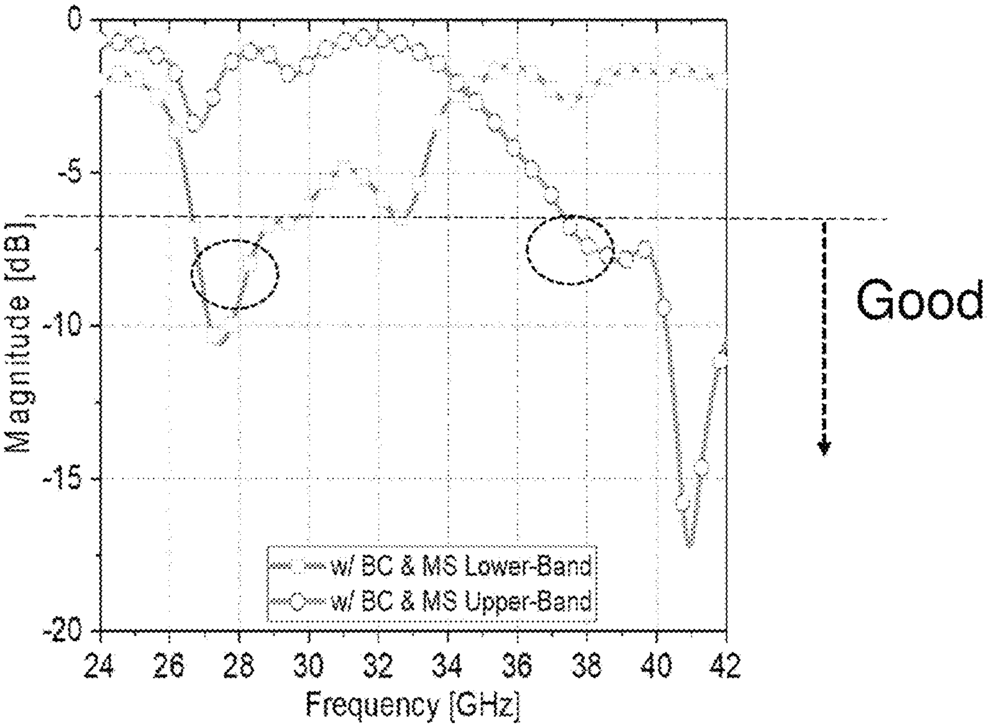
FIG. 26 is a simulation diagram illustrating a return loss in this embodiment.

Furthermore, in this embodiment, as illustrated in FIG. 26, in both of the low frequency and the high frequency, good results of a S11 return loss being −7 dB or less are obtained. This means that impedance matching is properly achieved. Although not illustrated in the diagram, in this embodiment, a gain is 11.3 dBi at 28 GHz and a gain is 8.94 dBi at 38 GHz. For example, compared with the case of without the metasurface, the gain is improved by around 2 dBi. Additionally, although not illustrated, in this embodiment, distortion of a radiation pattern is reduced.

In the basic structure of this embodiment, since the pictorial pattern layer of the back cover 1I is arranged on the upper side of the antenna structure 9I, there is a possibility that attenuation occurs and therefore the antenna radiation characteristics decrease.

Additionally, in the basic structure of this embodiment, the cover member 5I is arranged on the upper side of the antenna structure 9I, and this also has a possibility of generating attenuation.

Thus, in this embodiment, the metasurface 31I is arranged on the upper side of the array antenna 35I to suppress the decrease in antenna radiation characteristics by the cover member 5I. In addition, the metasurface 31I constitutes the equivalent circuit that matches the impedances between the feed unit that inputs the high frequency power to the antenna element and the antenna element. Therefore, the antenna performance is improved. This allows obtaining the highly directional and high-gain antenna.

As described above, in this embodiment, the back cover 1I includes the metasurfaces 31I to achieve the designed back cover as a stand-alone product, and is used in combination with the substrate 3I on which the array antenna 35I is formed.

(1) First Modified Example of Ninth Embodiment

In the ninth embodiment, the first pattern and the second pattern of the metasurface are formed on the same surface, but may be formed on different surfaces.

Figure 27:
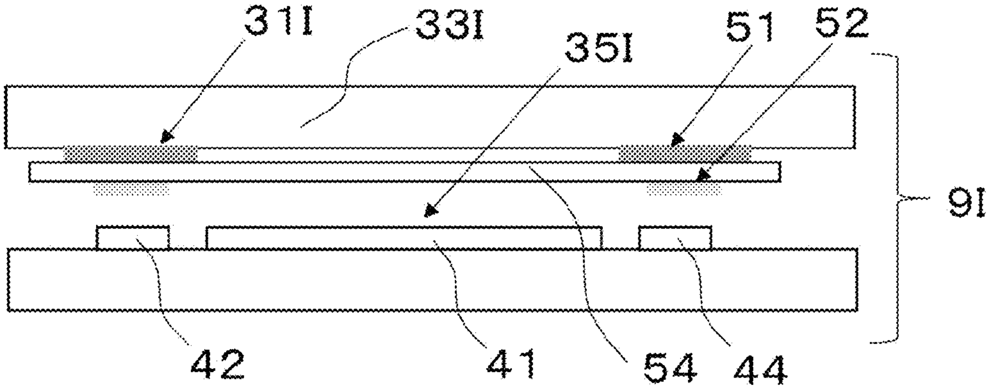
FIG. 27 is a schematic cross-sectional view illustrating a correspondence relationship between a metasurface and an array antenna according to a first modified example.

Such an embodiment will be described as the first modified example of the ninth embodiment with reference to FIG. 27. FIG. 27 is a schematic cross-sectional view illustrating a correspondence relationship between a metasurface and an array antenna according to the first modified example.

A low-loss film 54 is provided on the lower surface of the low-loss film 33I. The low-loss film 54 is made of resin, for example. The first pattern 51 of the metasurface 31I is formed on the upper surface of the low-loss film 54, and the second pattern 52 of the metasurface 31I is formed on the lower surface of the low-loss film 54.

In the structure described above, the first pattern 51 and the second pattern 52 can be arranged to be overlapped in the layering direction. Therefore, freedom of design of the metasurface increases, resulting in improved antenna performance.

Further, making the number of the low-loss films 54 plural further increases the freedom of design of the metasurfaces, resulting in improved antenna performance.

Note that in the configuration of FIG. 27, the low-loss film 33I may be omitted. In that case, a coating layer is provided to protect the first pattern 51.

(2) Second Modified Example of Ninth Embodiment

Metasurfaces can be variously shaped and arranged depending on a shape of array antennas and required characteristics. The following will describe a variation in the patterns of the metasurfaces according to second to fifth modified examples.

Figure 28:
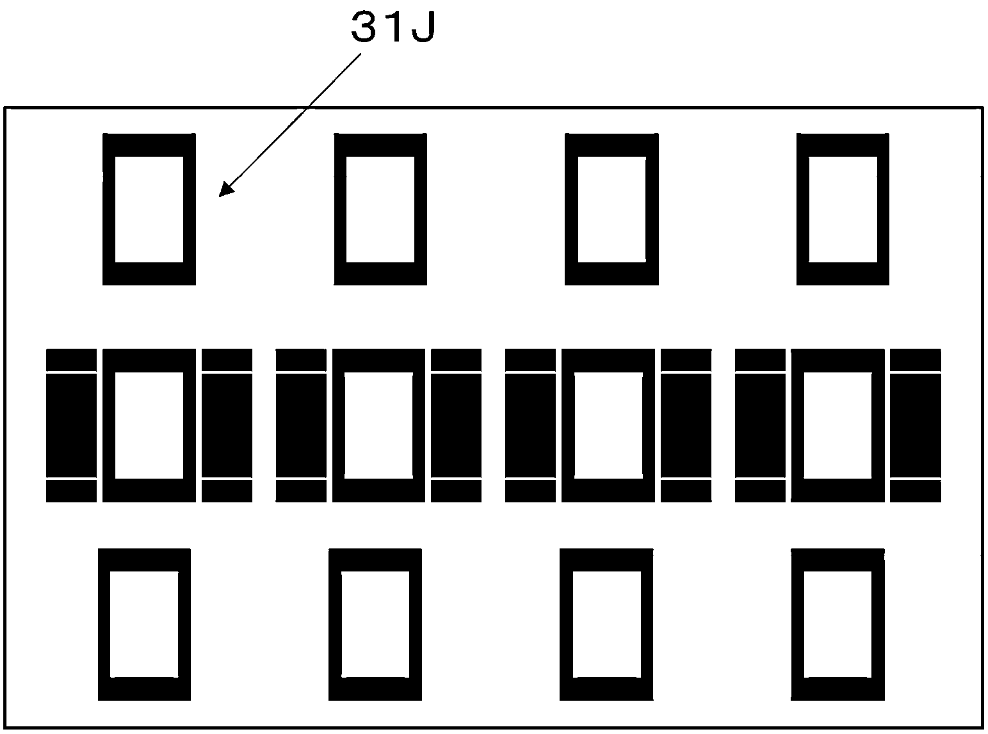
FIG. 28 is a schematic plan view illustrating a pattern of metasurfaces according to a second modified example.

The second modified example of the ninth embodiment will be described with reference to FIG. 28. FIG. 28 is a schematic plan view illustrating the pattern of the metasurfaces according to the second modified example.

As the pattern corresponding to four array antennas, metasurfaces 31J have a three-rectangle frame-shaped pattern aligned in the vertical direction in the diagram, and a rectangular solid-shaped pattern (main patterns long in the vertical direction in the diagram and a pair of sub-patterns short in the vertical direction in the diagram and arranged on both upper and lower sides in the diagram) arranged on the right and left in the diagram of the middle rectangular frame-shaped patterns.

Note that the rectangular frame-shaped pattern of the metasurfaces 31J arranged in the middle in the vertical direction in the diagram and the pair of rectangular solid-shaped patterns provided on both sides thereof are provided corresponding to the array antennas.

(3) Third Modified Example of Ninth Embodiment

Figure 29:
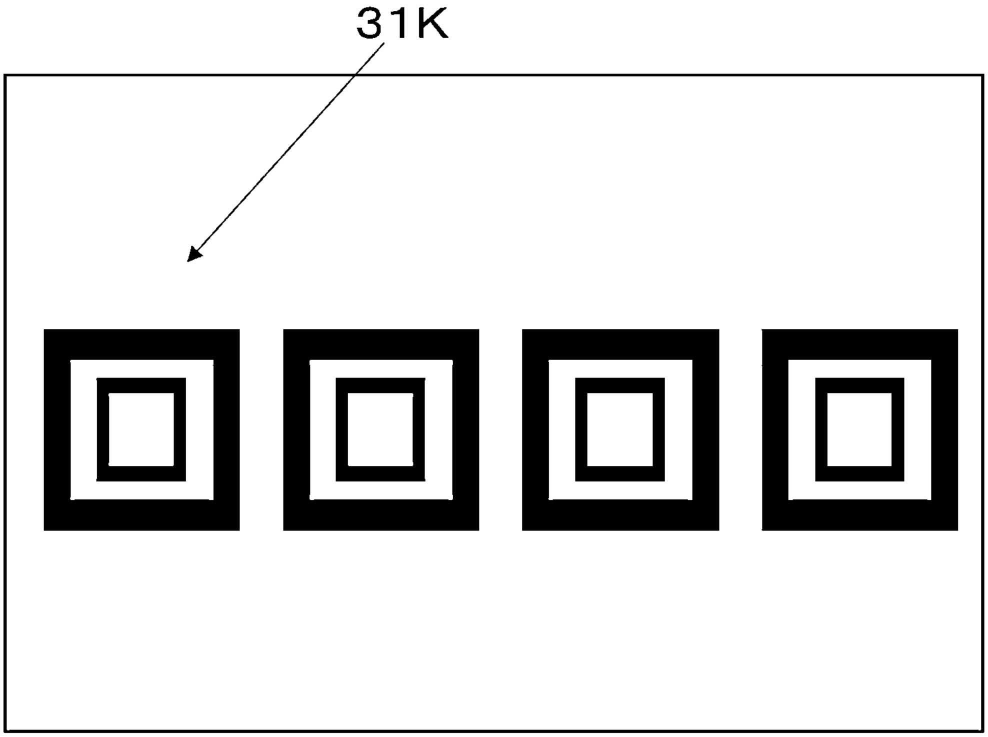
FIG. 29 is a schematic plan view illustrating a pattern of metasurfaces according to a third modified example.

The third modified example of the ninth embodiment will be described with reference to FIG. 29. FIG. 29 is a schematic plan view illustrating a pattern of metasurfaces according to the third modified example.

Metasurfaces 31K have a first rectangular frame-shaped pattern and a second rectangular frame-shaped pattern arranged outside thereof as the patterns corresponding to one array antenna.

(4) Fourth Modified Example of Ninth Embodiment

Figure 30:
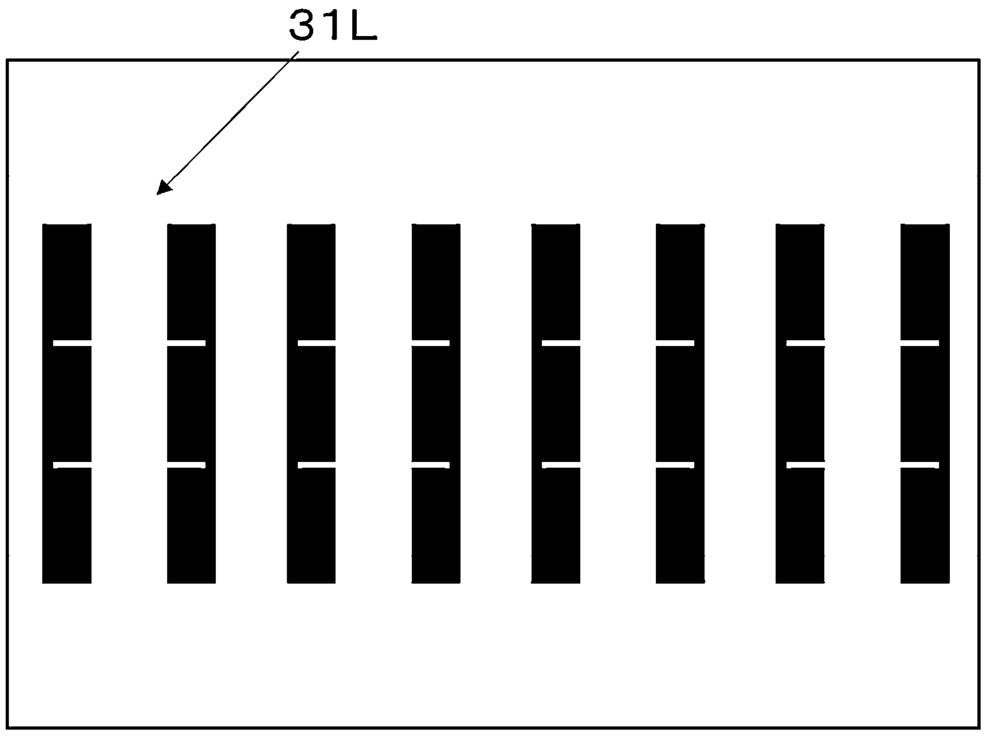
FIG. 30 is a schematic plan view illustrating a pattern of metasurfaces according to a fourth modified example.

The fourth modified example of the ninth embodiment will be described with reference to FIG. 30. FIG. 30 is a schematic plan view illustrating a pattern of metasurfaces according to the fourth modified example.

Metasurfaces 31L have a pair of rectangles solid-shaped pattern extending in the vertical direction in the diagram as the pattern corresponding to one array antenna. Each rectangular solid-shaped pattern has slits extending in the left-right direction in the diagram and facing one another.

(5) Fifth Modified Example of Ninth Embodiment

Figure 31:
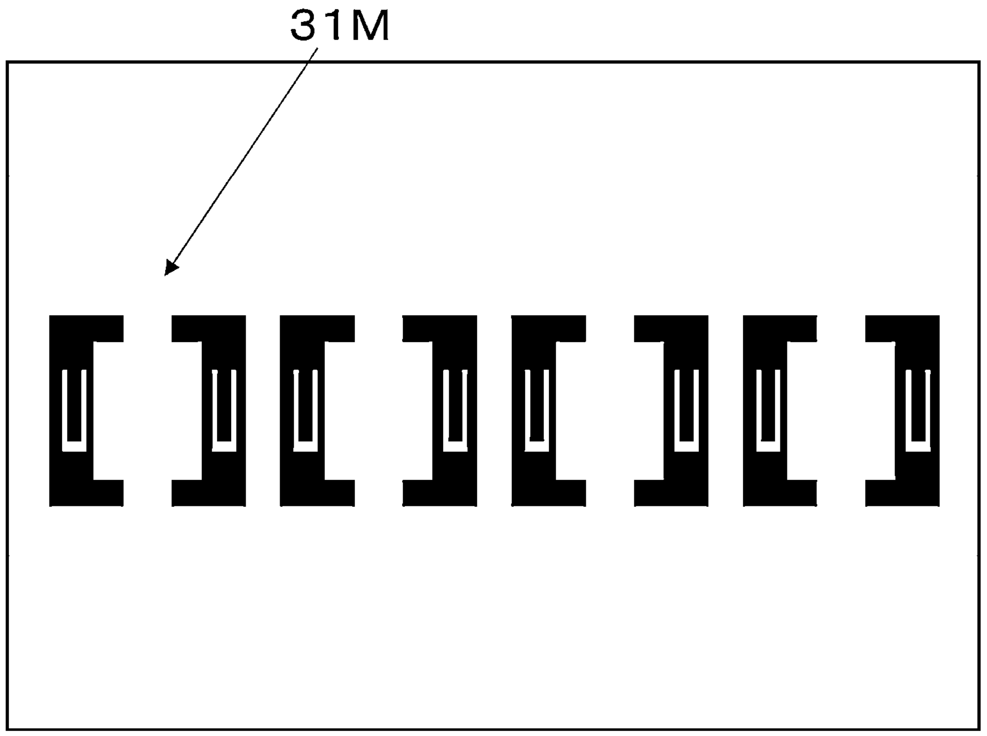
FIG. 31 is a schematic plan view illustrating a pattern of metasurfaces according to a fifth modified example.

The fifth modified example of the ninth embodiment will be described with reference to FIG. 31. FIG. 31 is a schematic plan view illustrating a pattern of metasurfaces according to the fifth modified example.

Metasurfaces 31M have a pair of rectangles solid-shaped pattern extending in the vertical direction in the diagram as the pattern corresponding to one array antenna. Each rectangular solid-shaped pattern has protrusions extending in the direction close to one another at both ends in the vertical direction in the diagram. Furthermore, each rectangular solid-shaped pattern has a U-shaped slit or a C-shaped slit opening to the upper side in the diagram.

10. Tenth Embodiment

In the ninth embodiment, the array antenna is for single polarization, but the present invention is also applicable to an array antenna for multiple polarization. In the case, a pattern structure of metasurfaces 31N has a pattern for multiple polarization.

Figure 32:
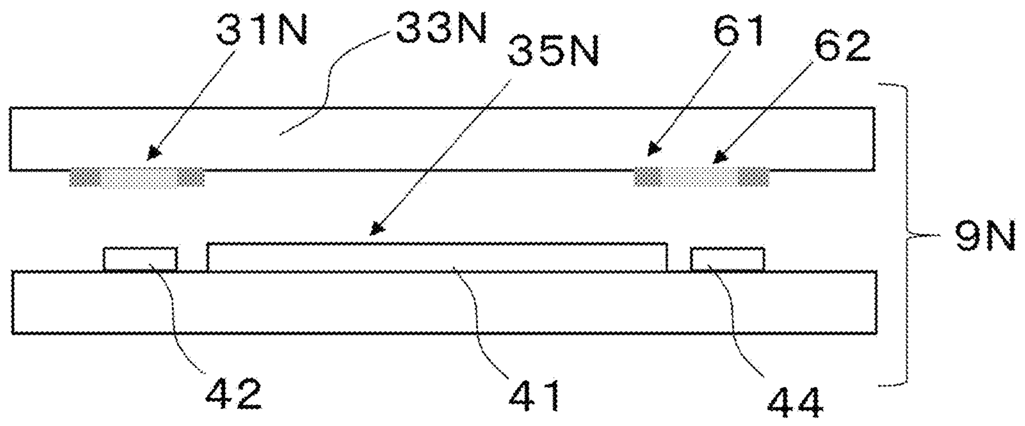
FIG. 32 is a schematic cross-sectional view illustrating a correspondence relationship between a metasurface and an array antenna according to a tenth embodiment.
Figure 33:
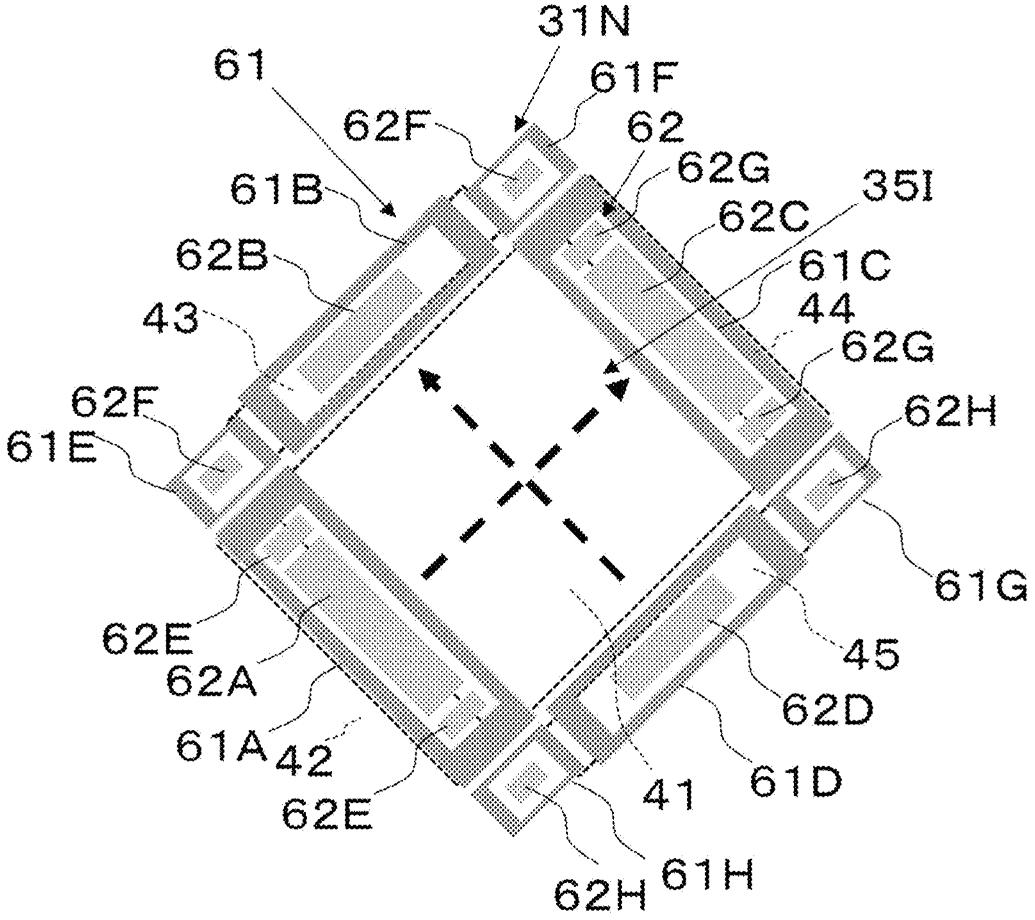
FIG. 33 is a schematic plan view illustrating a correspondence relationship between the metasurface and the array antenna.
Figure 34:
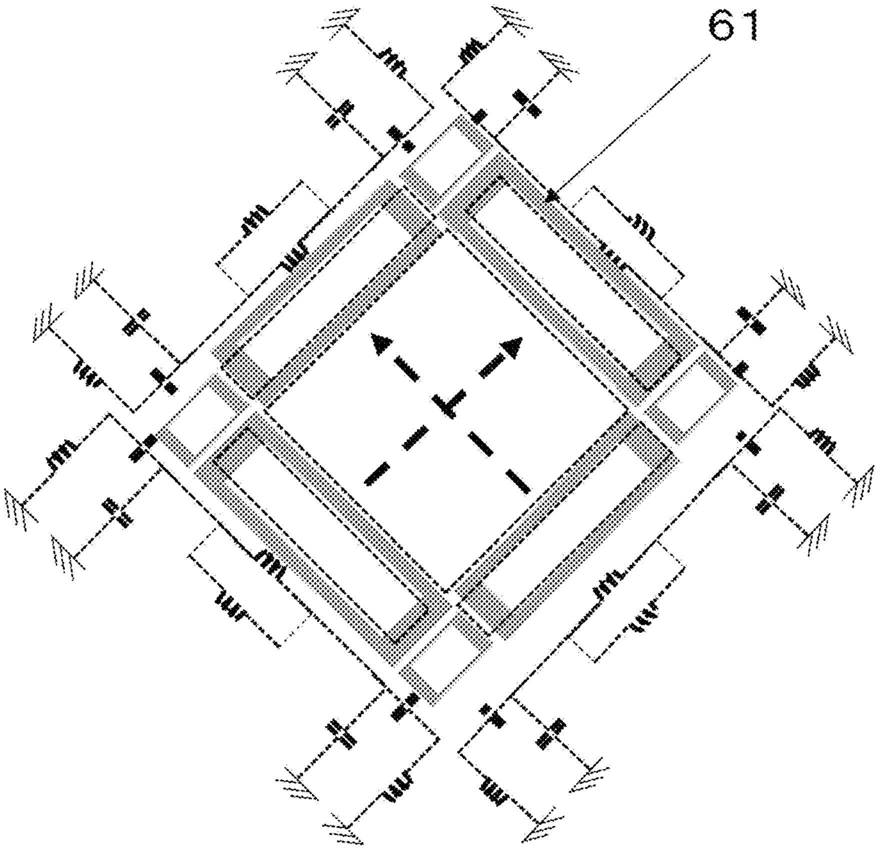
FIG. 34 is a schematic plan view of a first pattern of the metasurface including an equivalent circuit.
Figure 35:
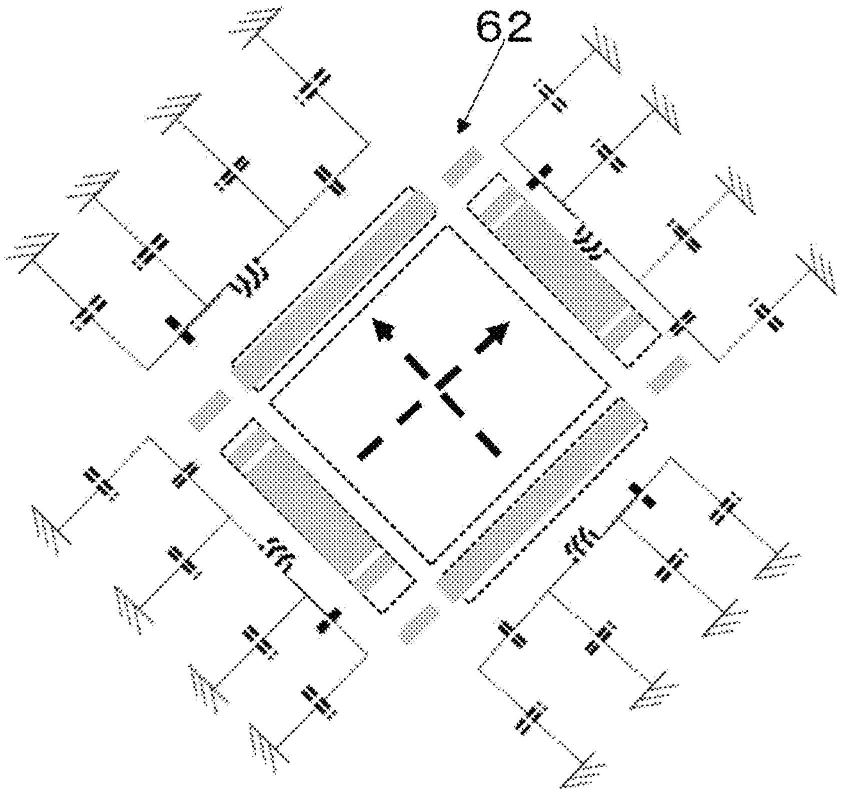
FIG. 35 is a schematic plan view of a second pattern of the metasurface including an equivalent circuit.

Such an embodiment will be described as the tenth embodiment with reference to FIG. 32 to FIG. 35. FIG. 32 is a schematic cross-sectional view illustrating a correspondence relationship between a metasurface and an array antenna according to the tenth embodiment. FIG. 33 is a schematic plan view illustrating a correspondence relationship between the metasurface and the array antenna. FIG. 34 is a schematic plan view of a first pattern of the metasurface including an equivalent circuit. FIG. 35 is a schematic plan view of a second pattern of the metasurface including an equivalent circuit.

The antenna structure 9I handles multiple bands (specifically, a dual band), and is a 5G antenna for multiple polarization. Note that in the following description, the description of the same configurations as those of the ninth embodiment will be omitted.

While an array antenna 35N has the same shape as that of the ninth embodiment, but is arranged to be inclined at 45 degrees. In this way, by inclining the antenna pattern at 45 degrees to achieve the 45-degree polarization, a progressive wave of transmission/reception becomes higher in a probability of transmission/reception than that of the antenna pattern fixed vertically/horizontally (the same applies to hereinafter).

As illustrated in FIG. 32 to FIG. 34, the metasurface 31N includes a first pattern 61. The first pattern 61 is indicated by dark gray, and in plan view, includes a first main pattern 61A corresponding to the second patch 42, a second main pattern 61B corresponding to a third patch 43, a third main pattern 61C corresponding to the fourth patch 44, and a fourth main pattern 61D corresponding to the fifth patch 45. Furthermore, the first pattern 61 includes first to fourth sub-patterns 61E to 61H formed at positions between the ends of the main patterns.

The first to fourth main patterns 61A to 61D have a frame shape. The first to fourth sub-patterns 61E to 61H have a frame shape.

As illustrated in FIG. 32, FIG. 33, and FIG. 35, the metasurface 31N has a second pattern 62. The second pattern 62 is indicated by light gray, and in plan view, includes a fifth main pattern 62A corresponding to the second patch 42, a sixth main pattern 62B corresponding to the third patch 43, a seventh main pattern 62C corresponding to the fourth patch 44, and an eighth main pattern 62D corresponding to the fourth patch 44. Furthermore, the second pattern 62 includes a pair of fifth sub-patterns 62E provided on both ends of the fifth main pattern 62A, a pair of sixth sub-patterns 62F provided on both ends of the sixth main pattern 62B, a pair of seventh sub-patterns 62G provided on both ends of the seventh main pattern 62C, and a pair of eighth sub-patterns 62H provided on both ends of the eighth main pattern 62B.

The pair of fifth sub-patterns 62E correspond to the second patch 42, and are arranged in the first main pattern 61A together with the fifth main pattern 62A in plan view.

The pair of seventh sub-patterns 62G correspond to the fourth patch 44, and are arranged in the third main pattern 61C together with the seventh main pattern 62C in plan view.

The pair of sixth sub-patterns 62F are arranged outside the third patch 43 in plan view, and are arranged in the respective first sub-pattern 61E and second sub-pattern 61F of the first pattern 61.

The pair of eighth sub-patterns 62H are arranged outside the fifth patch 45 in plan view, and are arranged in respective third sub-pattern 61G and fourth sub-pattern 61H of the first pattern 61.

The fifth to eighth main patterns 62A to 62D have a solid shape and are arranged to overlap with the second to fifth patches 42 to 45, respectively. A pair of the fifth to eighth sub-patterns 62E-62H have a solid shape.

The dashed arrows illustrated in FIG. 33 to FIG. 35 are the direction of power feed, and thus a dual-polarization (vertical polarization and horizontal polarization) antenna is achieved.

By the arrangement described above, the equivalent circuit illustrated in FIG. 34 is formed with the first pattern 61. Also, the equivalent circuit illustrated in FIG. 35 is formed with the second pattern 62.

Using such equivalent circuits, impedance matching is performed. For example, by bringing the impedance position in a Smith Chart to the center (a fully matched position), the impedance matching is performed. Specifically, in a reference example with the cover and without the metasurface, the position of the impedance in the Smith Chart is approximated to the center of the circle at the corresponding frequency.

(1) First Modified Example of Tenth Embodiment

In the tenth embodiment, the first pattern and the second pattern of the metasurface are formed on the same surface, but may be formed on different surfaces.

Figure 36:
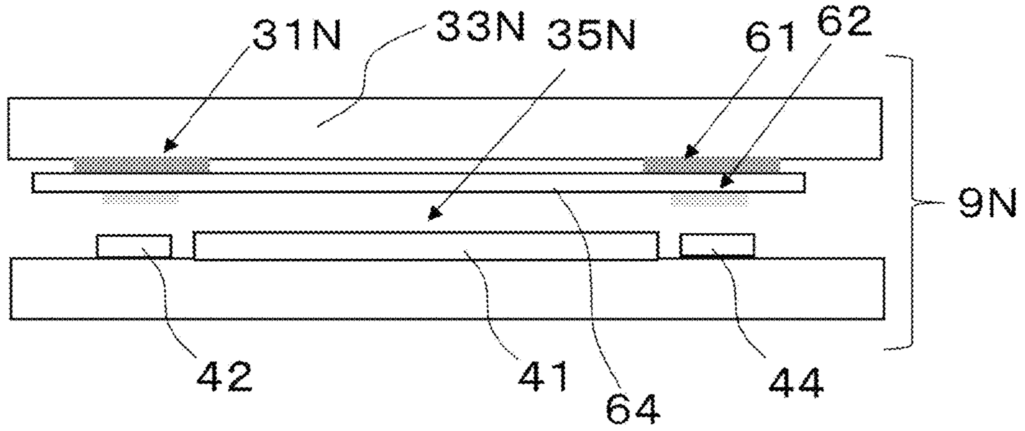
FIG. 36 is a schematic cross-sectional view illustrating a correspondence relationship between a metasurface and an array antenna according to a first modified example.

The first modified example of the tenth embodiment will be described with reference to FIG. 36. FIG. 36 is a schematic cross-sectional view illustrating a correspondence relationship between a metasurface and an array antenna according to the first modified example.

A low-loss film 64 is provided on a lower surface of a low-loss film 33N. The low-loss film 64 is made of resin, for example. The first pattern 61 of the metasurface 31N is formed on the upper surface of the low-loss film 64, and the second pattern 62 of the metasurface 31N is formed on the lower surface of the low-loss film 64.

In the structure described above, the first pattern 61 and the second pattern 62 can be arranged to be overlapped in the layering direction. Therefore, freedom of design of the metasurface increases, resulting in improved antenna performance.

Further, making the number of the low-loss films 64 plural further increases the freedom of design of the metasurfaces, resulting in improved antenna performance.

(2) Second Modified Example of Tenth Embodiment

Metasurfaces can be variously shaped and arranged depending on a shape of array antennas and required characteristics. The following will describe a variation in the patterns of the metasurfaces according to second to fifth modified examples.

Figure 37:
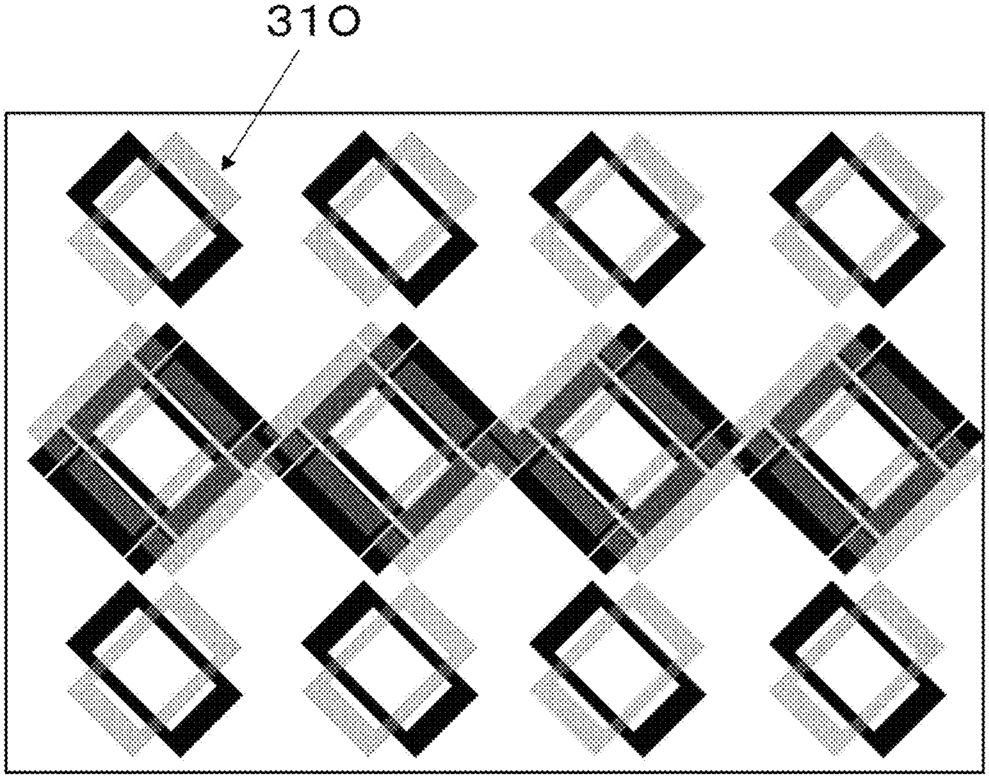
FIG. 37 is a schematic plan view illustrating a pattern of metasurfaces according to a second modified example.

The second modified example of the tenth embodiment will be described with reference to FIG. 37. FIG. 37 is a schematic plan view illustrating a pattern of metasurfaces according to the second modified example.

Similarly to the second modified example of the ninth embodiment, metasurfaces 31O have a three-rectangle frame-shaped pattern and a rectangular solid pattern arranged on both sides of the middle rectangular shape pattern as a pattern corresponding to one array antenna.

However, the metasurface 31O is inclined at 45 degrees from the arrangement of each pattern of the second modified example of the ninth embodiment.

Further, as illustrated in FIG. 37, the metasurface 31O includes a black first layer and a grey second layer. The corresponding patterns of the first layer and the second layer are mutually aligned in the layering direction, but the directions are displaced at 90 degrees.

The first layer and the second layer of the metasurface 31O are formed on respective surfaces of a base substrate film. As a modified example, a film in which the first layer of the metasurface is formed and a film in which the second layer is formed may be layered.

(3) Third Modified Example of Tenth Embodiment

Figure 38:
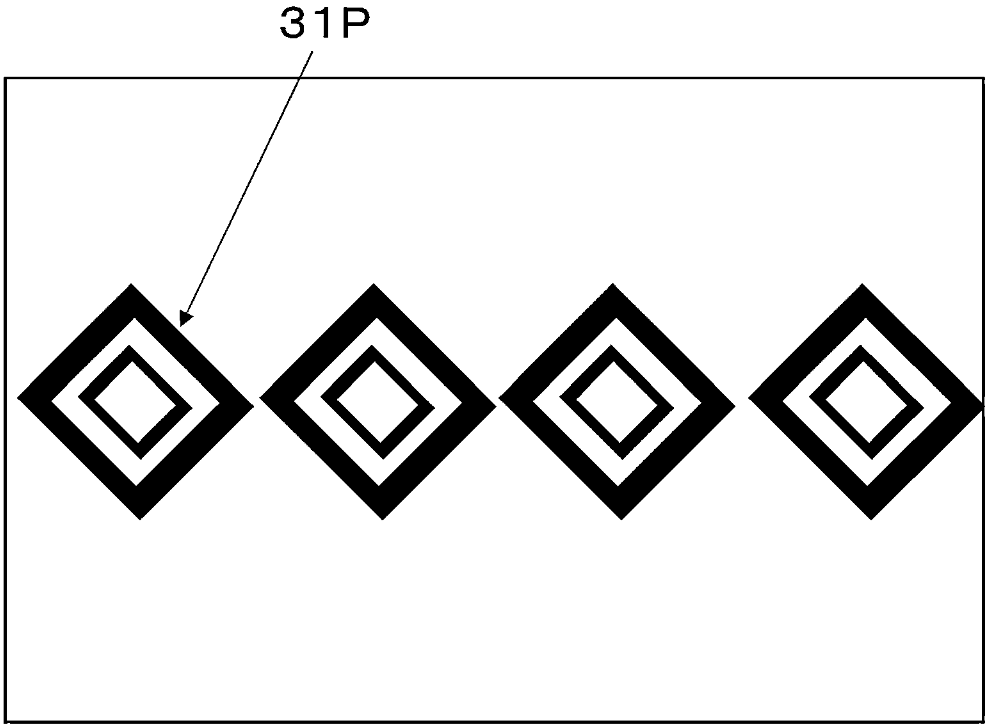
FIG. 38 is a schematic plan view illustrating a pattern of metasurfaces according to a third modified example.

The third modified example of the tenth embodiment will be described with reference to FIG. 38. FIG. 38 is a schematic plan view illustrating a pattern of metasurfaces according to the third modified example.

Similarly to the third modified example of the ninth embodiment, metasurfaces 31P have a first rectangular frame-shaped pattern and a second rectangular frame-shaped pattern arranged outside thereof as the patterns corresponding to one array antenna.

However, the metasurface 31P is inclined at 45 degrees from the arrangement of each pattern of the second modified example of the ninth embodiment.

(4) Fourth Modified Example of Tenth Embodiment

Figure 39:
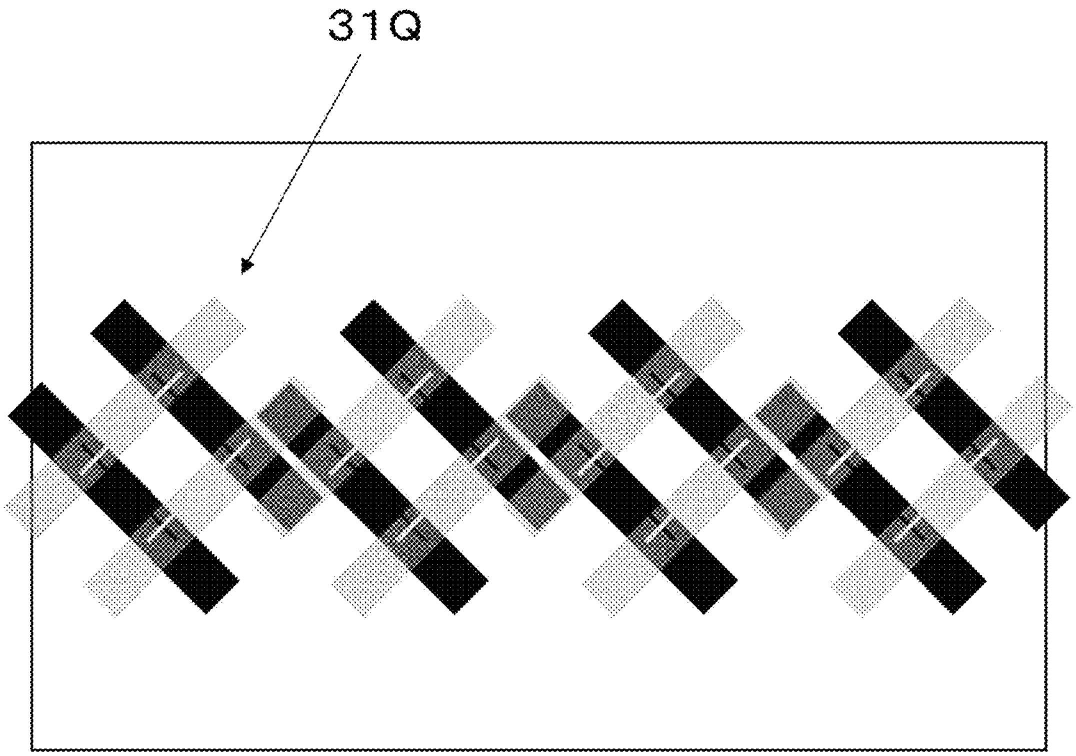
FIG. 39 is a schematic plan view illustrating a pattern of metasurfaces according to a fourth modified example.

The fourth modified example of the tenth embodiment will be described with reference to FIG. 39. FIG. 39 is a schematic plan view illustrating a pattern of metasurfaces according to the fourth modified example.

Similarly to the fourth modified example of the ninth embodiment, metasurfaces 31Q have a pair of rectangles solid-shaped pattern extending in the vertical direction in the diagram as the pattern corresponding to one array antenna. Each rectangular solid-shaped pattern has slits extending in the left-right direction in the diagram and facing one another.

However, the metasurface 31Q is inclined at 45 degrees from the arrangement of each pattern of the fourth modified example of the ninth embodiment.

Further, as illustrated in FIG. 39, the metasurface 31Q includes a black first layer and a grey second layer. The corresponding patterns of the first layer and the second layer are mutually aligned in the layering direction, but the directions are displaced at 90 degrees.

(5) Fifth Modified Example of Tenth Embodiment

Figure 40:
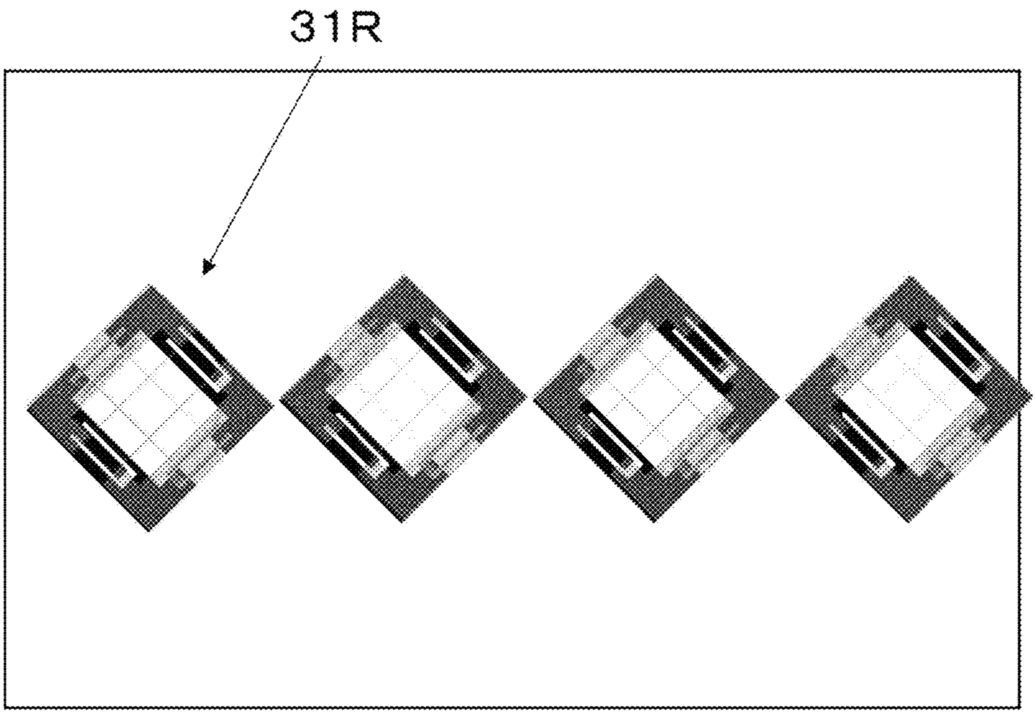
FIG. 40 is a schematic plan view illustrating a pattern of metasurfaces according to a fifth modified example.

The fifth modified example of the tenth embodiment will be described with reference to FIG. 40. FIG. 40 is a schematic plan view illustrating a pattern of metasurfaces according to the fifth modified example.

Similarly to the ninth embodiment, metasurfaces 31R have a pair of rectangles solid-shaped pattern extending in the vertical direction in the diagram as the pattern corresponding to one array antenna. Each rectangular solid-shaped pattern has protrusions extending in the direction close to one another at both ends in the vertical direction in the diagram. Furthermore, each rectangular solid-shaped pattern has a U-shaped slit or a C-shaped slit opening to the upper side in the diagram.

However, the metasurface 31R is inclined at 45 degrees from the arrangement of each pattern of the fifth modified example of the ninth embodiment.

Further, as illustrated in FIG. 40, the metasurface 31R includes a black first layer and a grey second layer. The corresponding patterns of the first layer and the second layer are mutually aligned in the layering direction, but the directions are displaced at 90 degrees.

Note that when the angle of the pattern of the metasurface is configured to have a right angle shape, a parasitic component is possibly generated, and a failure, such as a flow of an extra current, occurs. In order to reduce the parasitic component, a pattern (for example, a shape, a width, and an interval) of the metasurfaces is adjusted.

12. Other Embodiments

Although the plurality of embodiments of the present invention have been described as above, the present invention is not limited to the above-described embodiments, and various modified examples are possible without departing from the gist of the invention. In particular, the plurality of embodiments and modified examples described herein can be combined arbitrarily with one another as necessary.

In first embodiment, the low-loss film provided with the metasurfaces may be fixed to the cover layer.

In the first embodiment, the slit need not be formed at the position corresponding to the antenna structure in the metal vapor deposition layer.

The cover according to this embodiment is used not only for an electronic device, such as a smartphone, but also to an antenna of an antenna base station or a chassis of a relay. In that case, the cover is arranged on the surface of the front surface side, not the back of the chassis (the back cover).

In all of the first to tenth embodiments, the pattern shape of the metasurfaces can be changed to have a shape that allows the magnetic permeability to be a negative value, and further allows configuring the equivalent circuit that allows impedance matching. Changing the shape to such a shape improves antenna performance.

As modified examples of the ninth and tenth embodiments, the antenna may correspond to three or more frequency bands. In the case as well, the metasurfaces are designed to have a pattern corresponding to each frequency band. Also, each pattern of the metasurfaces may be any shape including a circle in addition to a rectangle.

INDUSTRIAL APPLICABILITY

The present invention is widely applicable to a cover with antenna function.

REFERENCE SIGNS LIST

1: Back cover
3: Substrate

5: Cover member
7: Pictorial pattern layer
9: Antenna structure
11: Adhesive layer
13: PET film
15: Metal vapor deposition layer
15*a*: Slit
17: First design layer
19: Adhesive layer
21: Second Design Layer
23: Base color layer
25: Backup layer
31: Metasurface
31*a*: Conductive member
31*b*: Hole
33: Low-loss film
35: Ground electrode
35*a*: Opening portion
37: Feed line

The invention claimed is:

1. A cover with antenna function to be mounted on a substrate provided with an electromagnetic wave transmission path, the cover with antenna function comprising:
a cover layer;
a pictorial pattern layer arranged in a layering direction with respect to the cover layer and including a metal vapor deposition layer;
a metasurface arranged side by side in the layering direction with the pictorial pattern layer, the metasurface amplifying an antenna signal; and
an array antenna arranged between the metasurface and the electromagnetic wave transmission path in the layering direction.

2. The cover with antenna function according to claim 1, further comprising
a feed unit that includes the electromagnetic wave transmission path, the feed unit inputting a high frequency power to the antenna element, wherein
the metasurface has a shape to constitute an equivalent circuit that matches impedances between the feed unit and the antenna element.

3. The cover with antenna function according to claim 1, wherein the metasurface is opposed to the electromagnetic wave transmission path in the layering direction between which the pictorial pattern layer is interposed.

4. The cover with antenna function according to claim 1, wherein the metasurface is arranged between the pictorial pattern layer and the electromagnetic wave transmission path in the layering direction, and the metasurface is opposed to the electromagnetic wave transmission path in the layering direction.

5. The cover with antenna function according to claim 1, wherein the metal vapor deposition layer has a thickness of 0.1 μm or less.

6. The cover with antenna function according to claim 1, wherein the metal vapor deposition layer is made of any of Al, Ag, Au, and Pt.

7. The cover with antenna function according to claim 1, wherein the metasurface has a fractal shape.

8. The cover with antenna function according to claim 1, wherein
the array antenna is configured to handle multiple bands; and
the metasurface has a pattern structure in which the metasurface is provided at a position opposed to the array antenna in the layering direction.

9. The cover with antenna function according to claim 8, wherein the metasurface has the pattern structure including a low-frequency pattern and a high-frequency pattern.

10. The cover with antenna function according to claim 8, wherein the metasurface has the pattern structure including a pattern for multiple polarization.

11. A cover with antenna function to be mounted on a substrate provided with an electromagnetic wave transmission path, the cover with antenna function comprising:
a cover layer;
a pictorial pattern layer arranged in a layering direction with respect to the cover layer and including a metal vapor deposition layer; and
an antenna structure including the electromagnetic wave transmission path, wherein the antenna structure includes
a low-loss film,
a metasurface formed on the low-loss film as a conductive member to amplify an antenna signal and aligned with the electromagnetic wave transmission path, and
an array antenna arranged between the metasurface and the electromagnetic wave transmission path.

12. The cover with antenna function according to claim 11, further wherein the array antenna is formed on the substrate.

13. The cover with antenna function according to claim 12, further comprising a ground electrode formed on the substrate opposite the array antenna.

14. The cover with antenna function according to claim 11, wherein the pictorial pattern is formed between the array antenna and the metasurface.

15. The cover with antenna function according to claim 11, wherein the metasurface includes conductive members.

16. The cover with antenna function according to claim 15, wherein the conductive members comprise a pattern corresponding to the array antenna.

17. A cover with antenna function to be mounted on a substrate provided with an electromagnetic wave transmission path, the cover with antenna function comprising:
a cover layer;
a pictorial pattern layer arranged in a layering direction with respect to the cover layer and including a metal vapor deposition layer;
a low-loss film having a plurality of metasurfaces arranged side by side in the layering direction with the pictorial pattern layer, wherein the plurality of metasurfaces are conductive members configured to amplify an antenna signal; and
a plurality of array antennas formed on the substrate and arranged between the plurality of metasurfaces and the electromagnetic wave transmission path in the layering direction, wherein each array antenna of the plurality of array antennas includes a low-frequency patch and a high-frequency path,
wherein the plurality of metasurfaces correspond to the plurality of array antennas, and
wherein each metasurface of the plurality of metasurfaces includes a first pattern corresponding to the low-frequency patch and a second pattern corresponding to the high-frequency patch of the respective array antenna.

18. The cover with antenna function of claim 17, wherein each array antenna includes an impedance patch to overlap the low-frequency patch and the high-frequency patch.

19. The cover with antenna function of claim 17, wherein the plurality of metasurfaces include conductive members having a shape and size.

* * * * *